United States Patent [19]

Wilson et al.

[11] Patent Number: 5,725,670
[45] Date of Patent: Mar. 10, 1998

[54] APPARATUS FOR POWDER COATING WELDED CANS

[75] Inventors: Timothy Edward Wilson, Amherst, Ohio; Masafumi Matsunaga, Yokohama; Wataru Kakuta, Kanagawa, both of Japan; Raymond J. Merk, Chicago, Ohio; Ronald E. Niemiec, Elyria, Ohio; Laurence B. Saidman, Avon Lake, Ohio; Gerald W. Crum, Elyria, Ohio; William L. Palmer, Lakewood, Ohio

[73] Assignee: Nordson Corporation, Westlake, Ohio

[21] Appl. No.: 587,327

[22] Filed: Jan. 16, 1996

Related U.S. Application Data

[63] Continuation-in-part of Ser. No. 393,150, Feb. 17, 1995, abandoned, which is a continuation-in-part of Ser. No. 198,506, Feb. 18, 1994, abandoned.

[51] Int. Cl.$^6$ ................................................. B05C 19/00
[52] U.S. Cl. .................... 118/629; 118/308; 118/312; 118/317; 118/326; 118/DIG. 3; 239/697; 239/704; 239/706; 239/708
[58] Field of Search .................. 118/629, 308, 118/312, 317, 326, DIG. 3; 427/476, 236, 239, 421; 239/697, 704, 706, 708, 127, 124, 427, 427.3, 427.5

[56] References Cited

U.S. PATENT DOCUMENTS

| Re. 33,394 | 10/1990 | Payne et al. . |
|---|---|---|
| 3,422,795 | 1/1969 | Smith . |
| 3,462,085 | 8/1969 | Nugarus . |
| 3,526,027 | 9/1970 | Manuel et al. . |
| 3,537,755 | 11/1970 | Schmidt . |
| 3,563,471 | 2/1971 | Watkin . |
| 3,678,336 | 7/1972 | Winkless . |
| 3,921,570 | 11/1975 | Hogstrom et al. . |
| 3,963,608 | 6/1976 | Zimmermann et al. . |
| 3,964,683 | 6/1976 | Gimple . |
| 3,977,607 | 8/1976 | Kobayshi et al. . |
| 3,995,075 | 11/1976 | Cernauskas et al. . |
| 4,083,607 | 4/1978 | Mott . |
| 4,098,226 | 7/1978 | Furter . |
| 4,109,027 | 8/1978 | Crose . |
| 4,158,071 | 6/1979 | Jordan et al. . |
| 4,180,011 | 12/1979 | Halicki . |
| 4,215,648 | 8/1980 | Stamets et al. . |

(List continued on next page.)

FOREIGN PATENT DOCUMENTS

| 0426258 | 10/1990 | European Pat. Off. . |
|---|---|---|
| 2509851 | 6/1975 | Germany . |
| 61-36470 | 8/1986 | Japan . |
| 360752 | 3/1991 | Japan . |
| 1068359 | 1/1984 | U.S.S.R. . |

*Primary Examiner*—Laura Edwards
*Attorney, Agent, or Firm*—Howard M. Cohn, Esq.

[57] ABSTRACT

Methods and apparatus are disclosed for spraying powder into the interior of welded hollow can bodies from a spray gun mounted to the welding arm of a can forming machine. The spray gun can either apply a stripe of highly charged powder on the welded seam areas of hollow can bodies, or can simultaneously apply a coating of powder having a first thickness on the longitudinally welded seam areas and a second thickness less than the first thickness on the remainder of the interior surface. Air is vented off from the powder flow being transported through the welding arm so that the powder to air ratio is increased. Air is introduced at the downstream end of the welding arm to provide a suction force to help draw the powder flow through the welding arm and to increase the velocity of the powder flow for better tribo charging of the powder in the gun and to improve spray pattern stability. A flow of cleaning air through the powder spray gun prevents powder from collecting on the front surface of an offset nozzle secured to the spray gun. The gun assembly is affectively grounded to prevent arcing, and has an exterior shape which has been geometrically configured to improve powder coating of the can.

19 Claims, 15 Drawing Sheets

U.S. PATENT DOCUMENTS

| | | |
|---|---|---|
| 4,218,227 | 8/1980 | Frey . |
| 4,259,923 | 4/1981 | Breen . |
| 4,314,669 | 2/1982 | Moos . |
| 4,343,436 | 8/1982 | Lehmann . |
| 4,346,667 | 8/1982 | Stamets et al. . |
| 4,376,143 | 3/1983 | Lehmann . |
| 4,380,320 | 4/1983 | Hollstein et al. . |
| 4,401,275 | 8/1983 | Ruud . |
| 4,608,269 | 8/1986 | Celant et al. . |
| 4,634,058 | 1/1987 | Hollstein et al. . |
| 4,637,339 | 1/1987 | Walser . |
| 4,707,054 | 11/1987 | Howard et al. . |
| 4,710,286 | 12/1987 | Mulder . |
| 4,739,935 | 4/1988 | Hastings et al. . |
| 4,759,946 | 7/1988 | Ribnitz . |
| 4,811,898 | 3/1989 | Murphy . |
| 4,819,898 | 4/1989 | Sharpless et al. . |
| 4,826,704 | 5/1989 | Walser . |
| 4,859,120 | 8/1989 | Tsubata et al. . |
| 4,869,201 | 9/1989 | Takahashi et al. . |
| 4,987,001 | 1/1991 | Knobbe et al. . |
| 5,018,910 | 5/1991 | Weiss . |
| 5,154,358 | 10/1992 | Hartle . |
| 5,173,325 | 12/1992 | Knobbe et al. . |
| 5,252,007 | 10/1993 | Klinzing et al. . |
| 5,344,082 | 9/1994 | Haller et al. . |

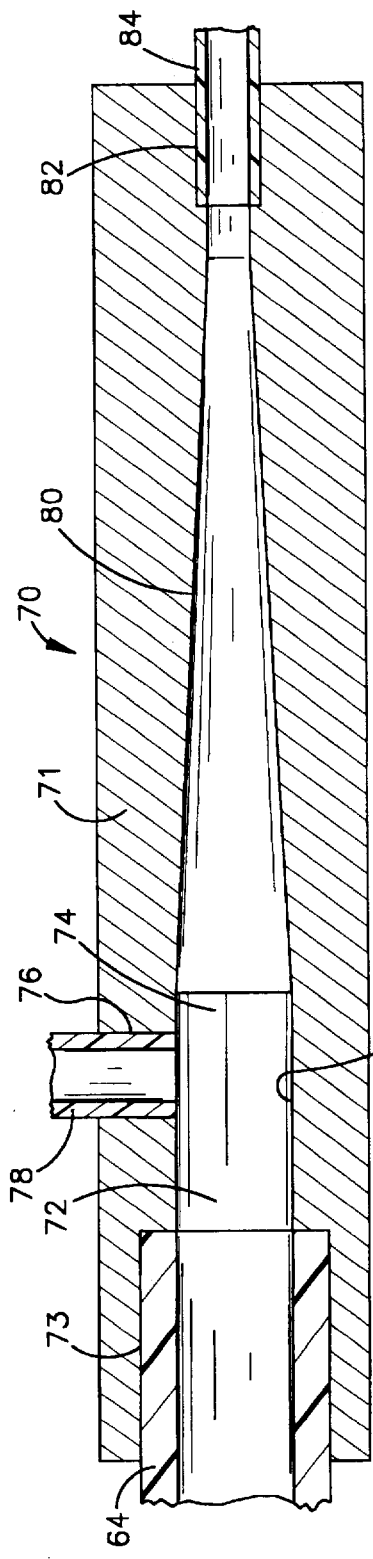
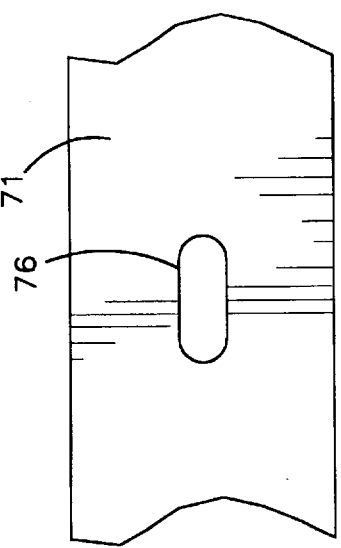
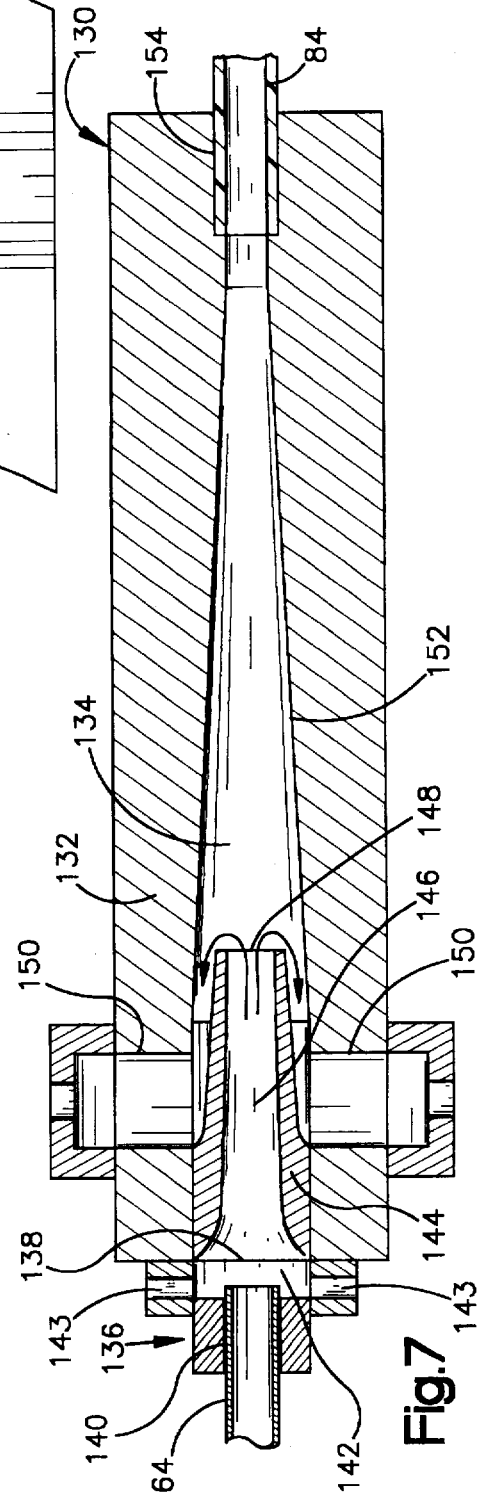

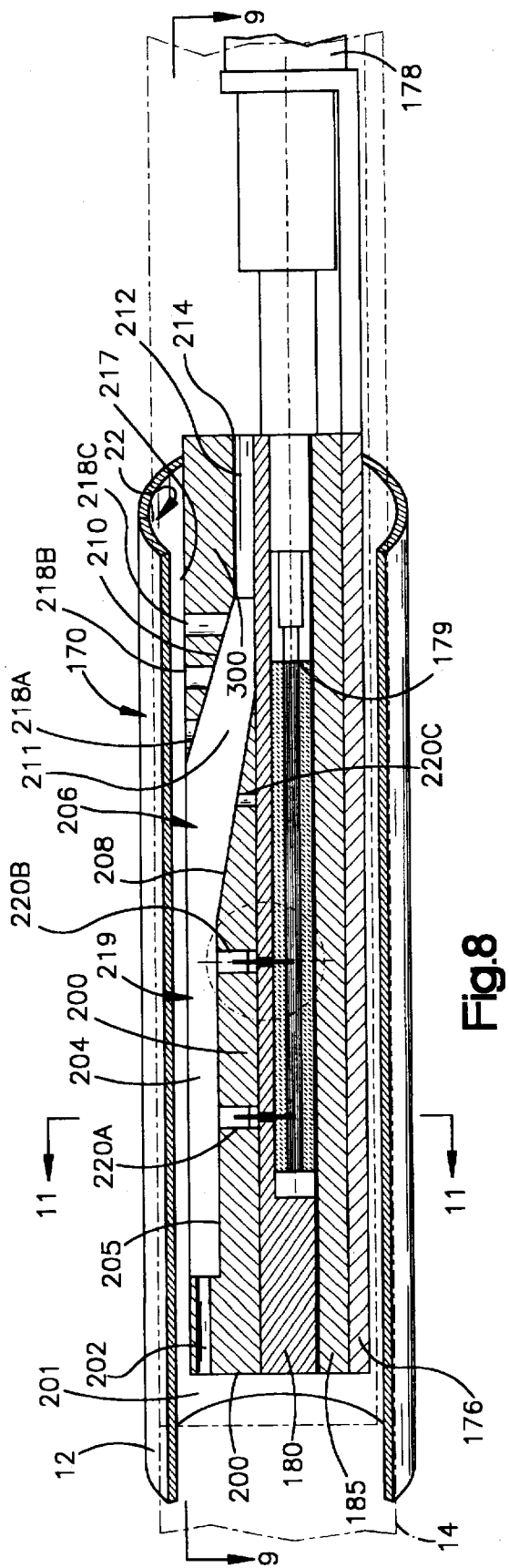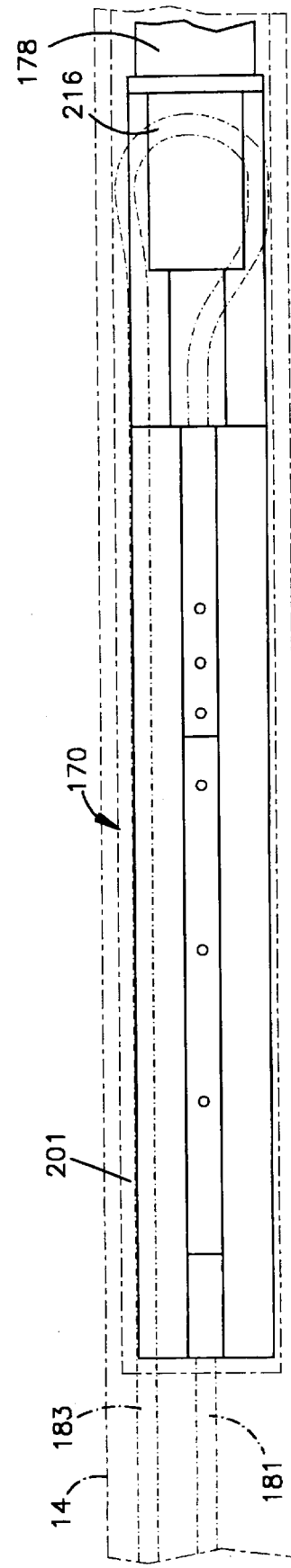

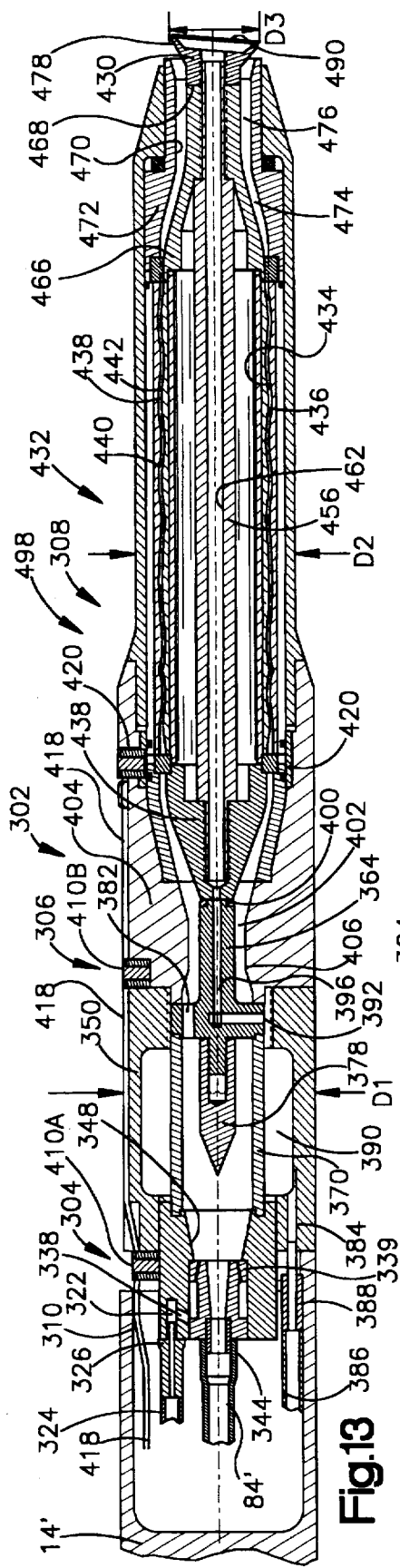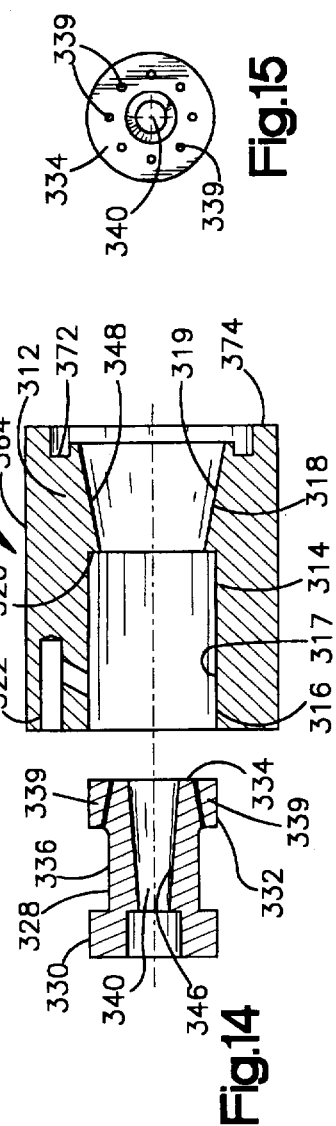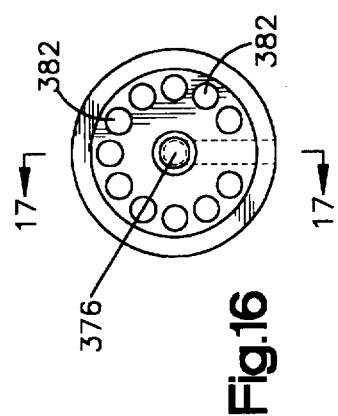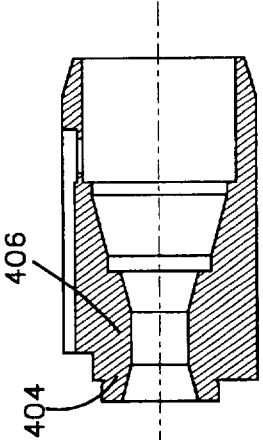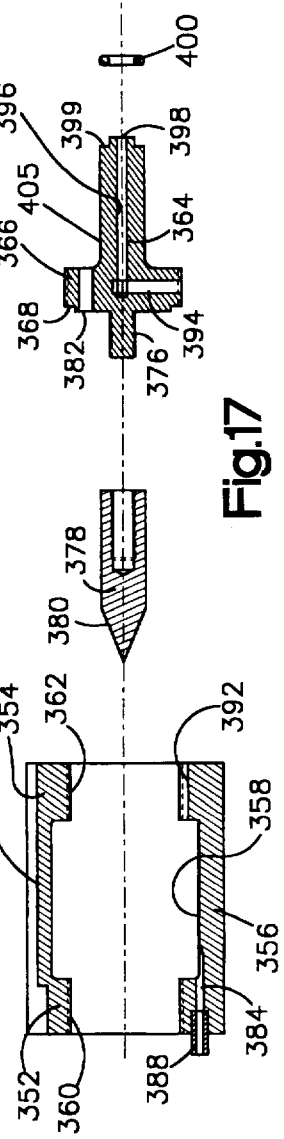

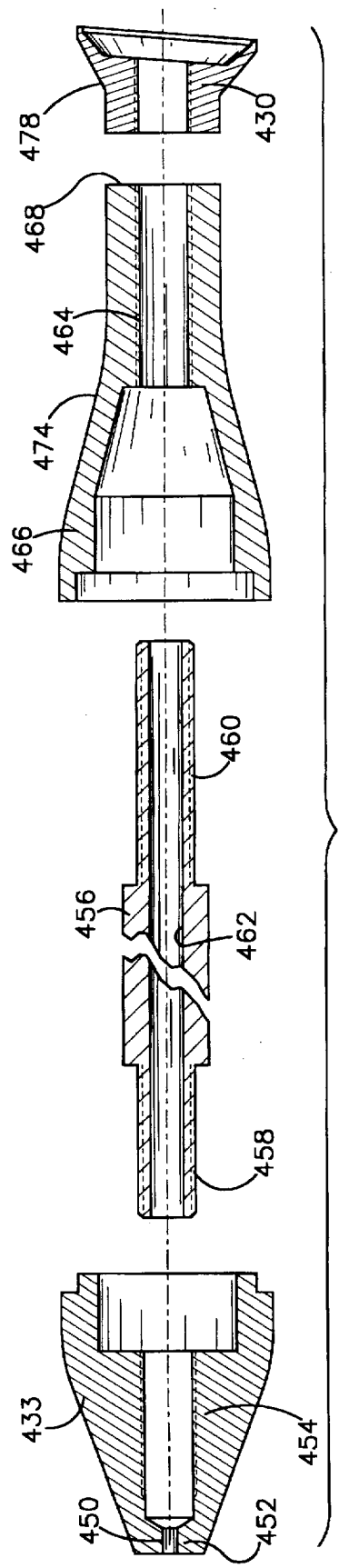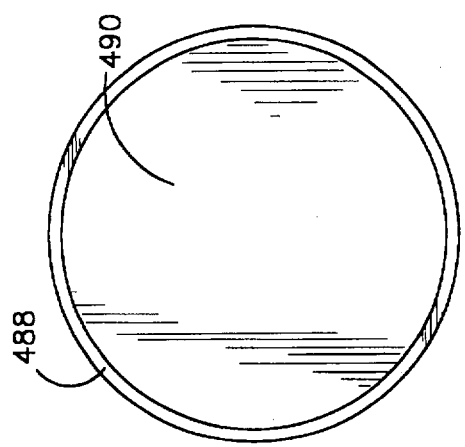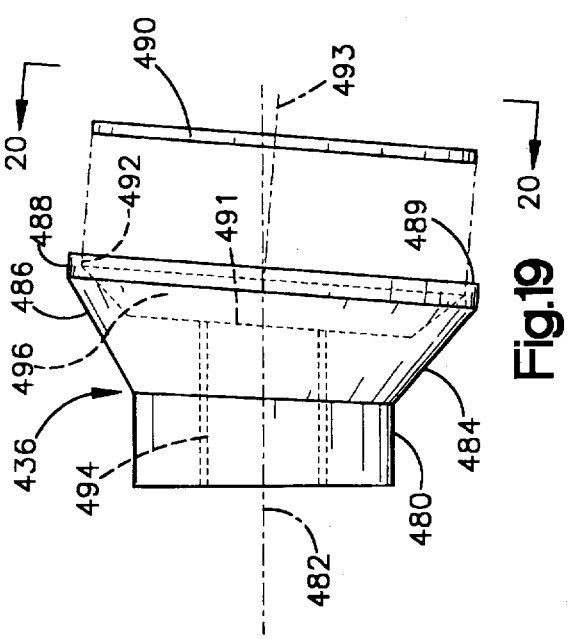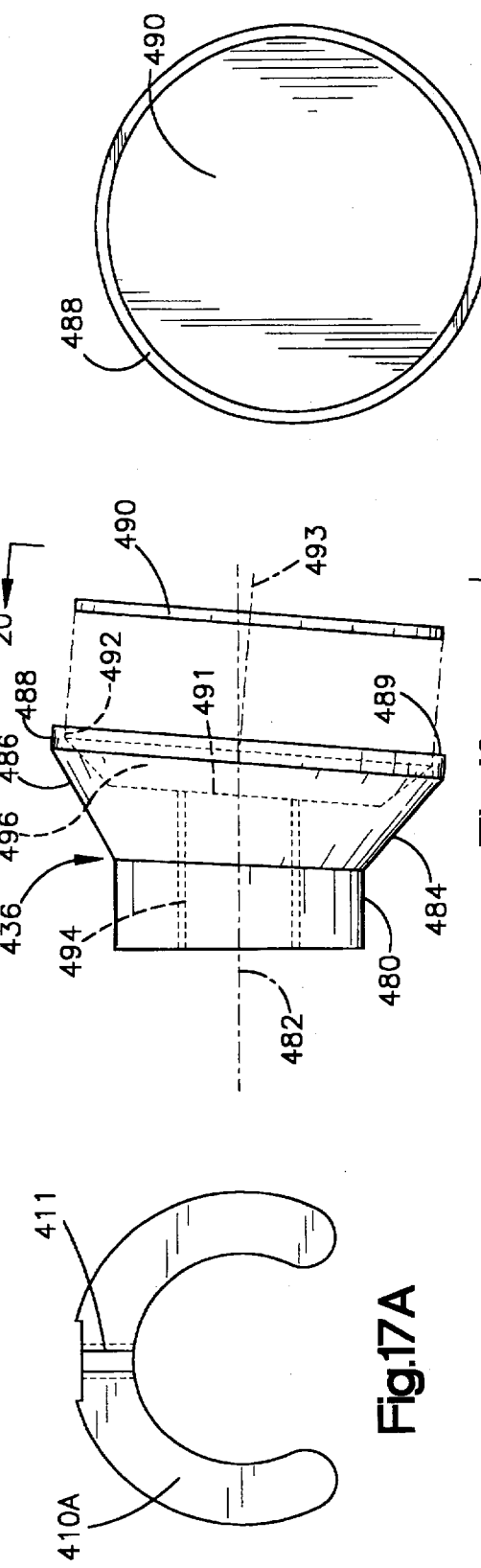

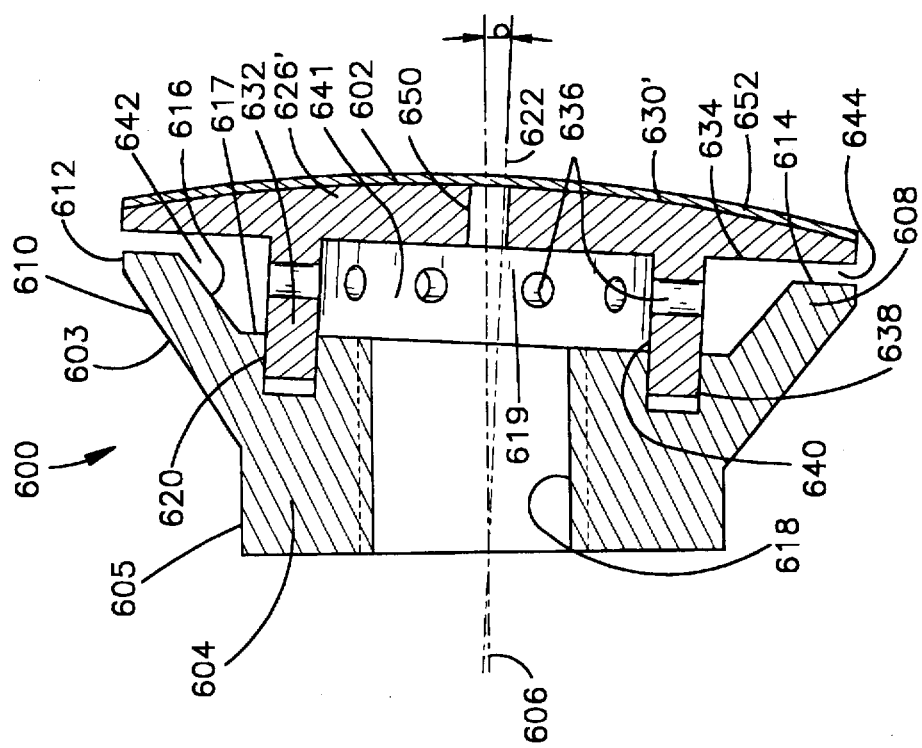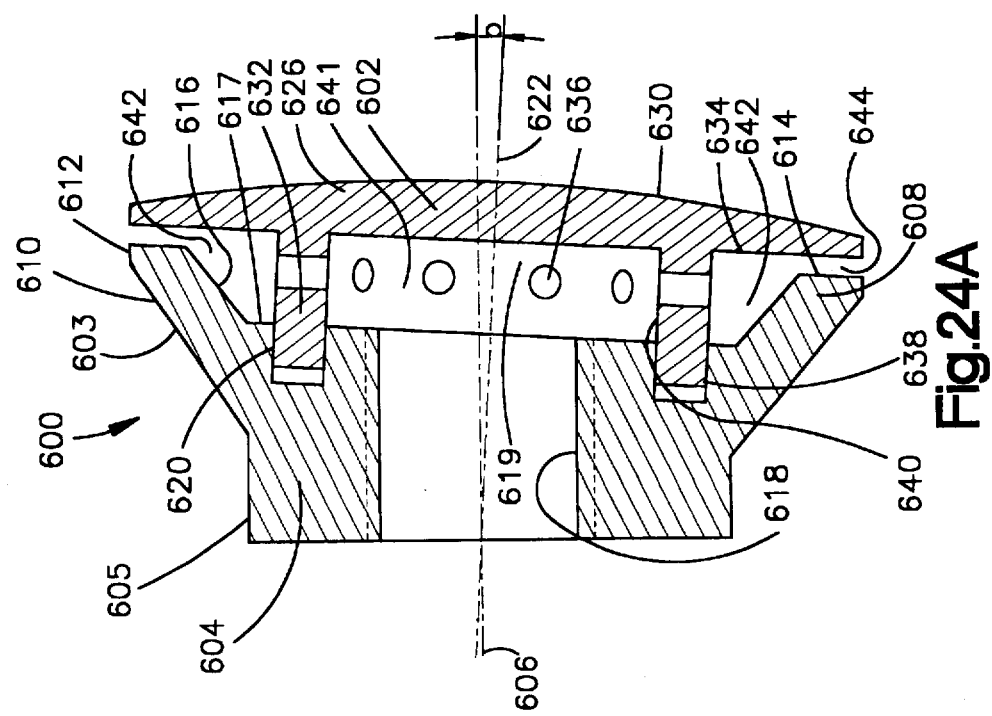

APPARATUS FOR POWDER COATING WELDED CANS

This is a continuation-in-part of U.S. application Ser. No. 08/393,150, filed Feb. 17, 1995 now abandoned which in turn is a continuation-in-part of U.S. application Ser. No. 08/198,506, filed Feb. 18, 1994 now abandoned.

FIELD OF THE INVENTION

This invention relates to the application of powder coatings to substrates and, more particularly, to the application of a powder coating on the interior surface of a three-piece metal can with a high concentration of powder.

BACKGROUND OF THE INVENTION

The process of manufacturing three-piece metal cans typically involves forming a cylindrical can body from a sheet of precoated metal and then attaching two precoated lids to the opposite ends of the can body. In constructing a cylindrical can body, a sheet or blank of metal is formed around a mandrel or stubhorn. The edges of the sheet are either butted or overlapped and then secured together by welding. The welded seam is covered with a protective coating to protect the contents of the can, e.g. food, against metal contamination. The welded seams are coated with either a liquid or powder coating. If a powder coating is used, oversprayed powder is typically recovered from within the container bodies by a vacuum device.

After covering the seam with the protective coating, the can is subjected to heat for a preset period of time to cure the coating material. Where powder coating is used, it is important that a uniform layer of the powder coating, typically a dry resin powder, is deposited on the seam so that the powder melts and fuses to form a smooth adherent coating within the preset period of curing time. If the coating is too thick in some area, it might not completely fuse within the curing time and can later contaminate the contents of the can.

According to the prior art, a coating of liquid material is typically applied to the interior welded seam of a can body as disclosed, for example, in U.S. Pat. Nos. 3,526,027, 4,215,648, 4,259,923 and 4,346,667, with a coating gun attached directly to the end of the welding arm or stubhorn. Other patents which teach the application of coating powder onto a welded seam of a can body with a powder applicator that is secured to the end of the welding arm include U.S. Pat. Nos. 4,215,648, 4,259,923 and Re 33,394.

It is desirable to coat the entire interior of the can with powder to avoid solvent emissions given off from can blanks which are precoated. In addition, liquid coatings typically must be applied in thin layers requiring the application of two coats with a curing step after each coat. This process requires a high amount of energy utilization since two curing ovens, or two passes through a single curing oven, are required. Powder coatings, on the other hand, have no solvent emissions and can be uniformly applied and cured in one step as a thicker coating. Other advantages can also be obtained by coating the interior surface of cans on the welding arm of a can forming machine powder. Up to the present time, however, the industry has not satisfactorily developed commercially suitable equipment to powder coat cans at the end of a welding arm.

U.S. Pat. No. 4,343,436, describes applying a coating of powder to the interior of a hollow can with a spray gun mounted on the end of a welding arm so that a thicker coating is applied to the welded seam as compared to the remainder of the interior surface of the can. This concept, as disclosed in the U.S. Pat. No. 4,343,436, is deficient, for example, because it does not describe how the amount of air-entrained powder needed to coat the entire interior surface of the can be transferred through the narrow passage of the welding arm at satisfactory flow rates without excessive transport air which then has to be removed from the interior of the can.

OBJECTS AND SUMMARY OF THE INVENTION

It is therefore an object of the present invention to provide an apparatus and method of applying a coating of powder on the interior surface of welded hollow can bodies to obviate the problems and limitations of the prior art systems.

It is a further object of the present invention to provide a method and apparatus of applying a stripe of coating powder on the welded seam areas of hollow can bodies to improve upon current powder stripe coating applications.

Yet another object of the present invention is to provide a method and apparatus for simultaneously applying a coating of powder having a first thickness on the longitudinally extending welded seam area and a second thickness less than the first thickness on the remainder of the interior surface of a hollow can or container body.

Still another object of the invention is to improve powder coating of a hollow can or container body with a spray gun mounted to the end of a welding arm by venting off air from a flow of air-entrained powder being transported through the welding arm so that the powder to air ratio of the air-entrained powder flowing into the welding arm is increased.

Another object of the invention is to further improve powder coating of a hollow container body with a spray gun mounted to the end of a welding arm by introducing compressed air into the flow of air-entrained powder exiting from the welding arm so that the velocity of the flow of the air-entrained powder being delivered to the spray gun is increased and a resulting suction force at the downstream end of the welding arm helps draw the air-entrained powder through the welding arm.

A further object of the invention is to introduce a flow of air into the air-entrained powder being delivered to the spray gun to mix the powder more evenly in the air and prevent the powder from concentrating on the bottom of the flow passage.

A still further object of the invention is to provide sufficient electrostatic charging power to ensure that the coating powder adheres to the interior of hollow container bodies being coated in a high speed welding and powder coating machine.

A yet further object of the invention is to provide a flow of cleaning air through the powder spray gun mounted to the end of a welding arm to prevent powder from collecting on the front surface of a nozzle assembly secured to the powder spray gun.

Still another object of the invention is to provide a powder gun assembly mounted to a welding arm wherein the gun assembly is shaped to enhance the attachment of coating powder to the interior surface of hollow container bodies.

Yet another object of the invention is to provide a powder gun assembly mounted to a welding arm wherein an offset nozzle deflector is assembled into the nozzle assembly of a powder coating gun so that the welded seam area is sprayed with more powder than the remainder of the interior surface of hollow container bodies.

An object of the invention is to provide a powder gun assembly mounted to a welding arm wherein a nozzle assembly for spray coating powder incorporates a powder deflector and air deflector assembly for directing a flow of air into the coating powder material being sprayed through the nozzle assembly for controlling the shape of the powder spray and for cleaning the front surface of the nozzle deflector from accumulated coating powder.

Still another object of the invention is to provide a powder gun assembly mounted to a welding arm wherein the gun assembly is effectively grounded through the welding arm to prevent the gun assembly from producing an electric arc.

Yet another object of the invention is to provide a collector hood in surrounding relation to two conveyors moving at different speeds and for collecting oversprayed powder escaping from between the hollow container bodies, vented off air and coating powder from a densifier, and from the powder coating gun when the container bodies are not moving past the coating gun.

According to the invention, a system and method for operating the system include electrostatically applying a coating of powder on at least a portion of the interior surface of hollow container bodies moving along a predetermined path in spaced relation to each other. A powder spray gun is mounted to the end of the welding arm of a can forming machine. The spray gun electrostatically charges air-entrained coating powder and sprays it through a nozzle into the hollow container bodies to coat the interior surface. The air-entrained coating powder is supplied to the spray gun through the welding arm from a source of air-entrained powder. A powder concentrating device, known as a densifier, is provided between the powder supply and the welding arm which supports the spray gun for venting off air and coating powder from the air-entrained powder. The effect is to increase the powder to air ratio of the air-entrained powder being transported through the welding arm to the spray gun to a level above the powder to air ratio of the air-entrained powder being transported from the source to the welding arm. The result is that a high volume of powder can be transported through the narrow passage of the welding arm with much less transport air. This permits a high concentration of powder to be sprayed into the container bodies for coating the entire interior surface of the container bodies moving at high speeds without the necessity of removing a high volume of transport air from within the container bodies.

According to another embodiment of the invention, a nozzle secured to the end of the spray gun sprays the air-entrained coating powder through a single continuous spray passage into the interior of the hollow container bodies to provide for simultaneous coating of longitudinally welded seam areas within the hollow container bodies with a first thickness of powder and the remainder of the interior surface of the hollow container bodies with a second thickness of powder less than the first thickness.

According to another embodiment of the invention, an amplifier is mounted between the welding arm and the spray gun to produce a suction force at the outlet of the narrow delivery passage of the welding arm for drawing the flow of air-entrained powder through the narrow delivery passage. A diffuser can be mounted between the amplifier and the spray gun to homogeneously mix the powder in the transfer air prior to charging the powder in the gun.

Further, in accordance with the invention, an air passage extends through the weld arm and the powder gun to provide pressurized air for cleaning a nozzle mounted to the outlet of the powder gun and/or shaping the powder spray directed into the hollow container bodies.

Also, according to the invention, a striping nozzle assembly is provided for applying a coating of powder to the welded seam area of hollow container bodies. The striping nozzle can be used in a system which may or may not include the densifier. The striping nozzle assembly has a powder flow path therethrough for directing a stream of air-entrained powder across the welded seam area of the hollow container bodies and a charging assembly spaced from the powder flow path. The charging assembly includes a plurality of spaced electrodes mounted in the nozzle body of the nozzle assembly between the powder flow path and the electrical conductor. Each of the electrodes is connected to a plug of silicon carbide fibers which electrostatically charge the stream of air-entrained powder to enhance the adherence of the air-entrained powder to the welded seam area of the hollow container bodies.

According to the invention, a powder spray gun assembly is effectively grounded to prevent arcing, and has an exterior shape which is geometrically configured to improve powder coating of the container bodies.

Further, according to the invention, a striping nozzle assembly can include an electrode plate with saw-like teeth for generating a large number of corona discharges from the saw-like teeth.

Another aspect of the invention relates to the provision of a collection hood disposed about the hollow container bodies being conveyed by two conveyors at different speeds. The collection hood is connected to a densifier for collecting vented off air and coating powder from the densifier as well as oversprayed powder escaping from the hollow container bodies. The hood includes a variable sized outlet opening that is moved to a fully closed position for drawing the air-entrained coating powder from the spray gun through a fixed opening when no hollow container bodies are moving through the hood. The variable sized outlet opening is moved to an open position for drawing the oversprayed air-entrained coating powder from between the hollow container bodies therethrough without adversely affecting the venting off air and coating powder in the densifier.

BRIEF DESCRIPTION OF THE DRAWINGS

These and other objects and advantages of this invention will be more readily apparent from the following description of the drawings in which:

FIG. 5 is a side elevational view, in cross section, of a powder densifier in accordance with the invention;

FIG. 6 is a partial top elevational view of the powder densifier of FIG. 5 showing the vent opening;

FIG. 7 is a side elevational view, in cross section, of a second embodiment of a powder densifier in accordance with the invention;

FIG. 8 is a side elevational view in cross section of an alternative embodiment of a nozzle secured to a welding arm and adapted to apply the coating powder to the welded seam of a can body in accordance with the invention;

FIG. 9 is a plan view taken along line 9—9 of FIG. 8 showing the powder flow through the nozzle;

FIG. 13 is an enlarged side view, in cross-section, of a powder spray gun connected to the end of a welding arm with an amplifier and diffuser connected between the end of the welding arm and the spray gun;

FIG. 14 is an exploded view of the air amplifier shown in FIG. 13;

FIG. 15 is an end view of the outlet of a throat element of the amplifier shown in FIG. 14 taken along line 15—15;

FIG. 16 is an end view of the distributor mount;

FIG. 17 is an exploded view of the diffuser (with the porous sleeve 370 removed) including, the diffuser body, the distributor, the distributor mount, and the gun collar;

FIG. 17A is a side elevational view of a ground ring;

FIG. 18 is an exploded view of a flow tube which extends through a powder gun and has a distributor inlet at one end and a distributor outlet and offset deflector mounted to the opposite end;

FIG. 19 is an exploded view of an offset deflector and porous disc assembly;

FIG. 20 is a front elevational view of the porous disc illustrated in FIG. 19;

FIG. 24A is an enlarged cross sectional view of the air deflector mounted in an offset powder deflector as shown in FIG. 24;

FIG. 25 is a cross sectional view of a modified air deflector mounted in an offset powder deflector with a porous cover element mounted to the front surface of the air deflector;

DETAILED DESCRIPTION OF THE INVENTION

Figure 1:
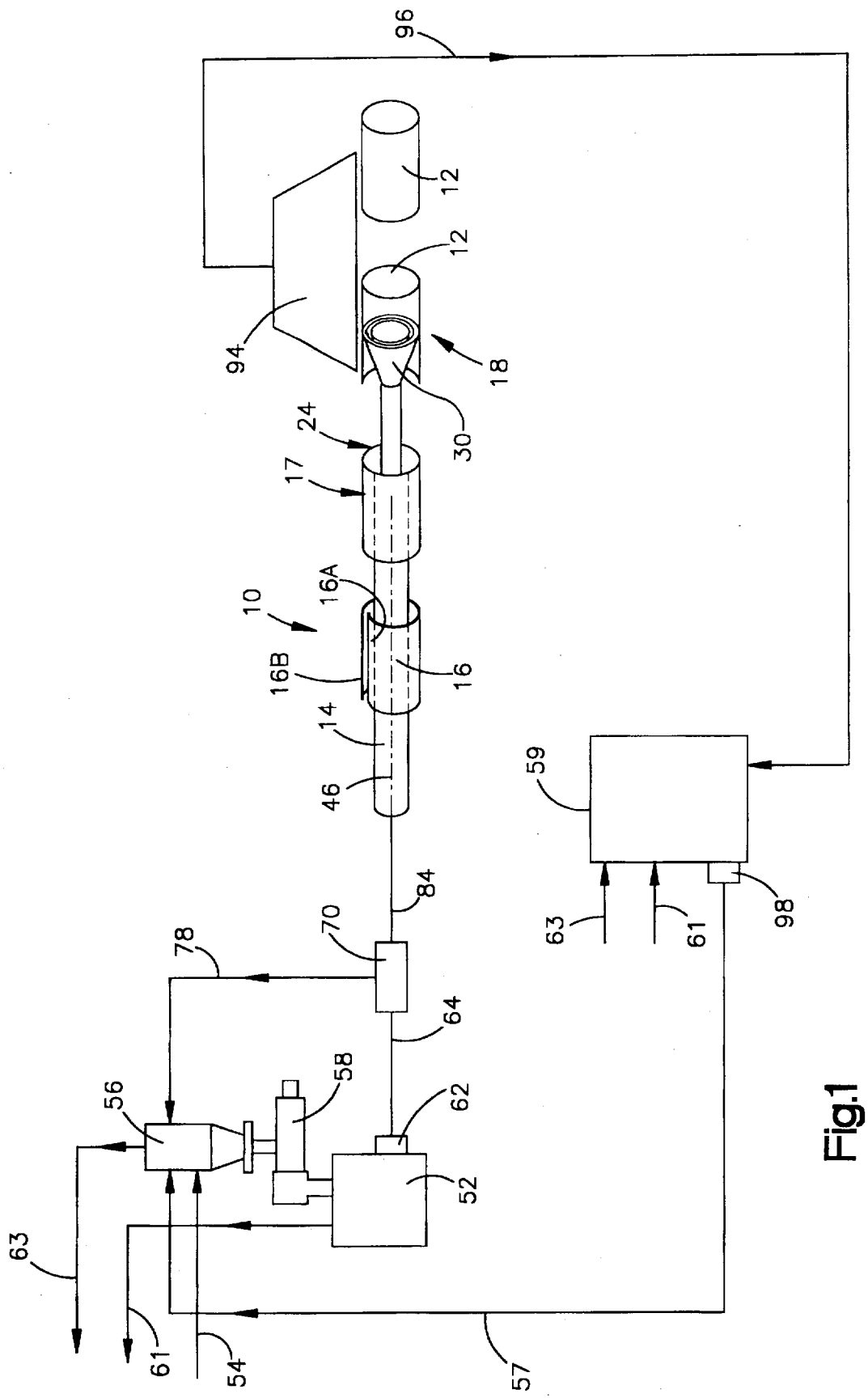
FIG. 1 is a schematic illustration of a can body production line which includes a system for applying a coating of powder to the interior surface of a welded hollow can body in accordance with the present invention.

Referring to FIG. 1, there is illustrated diagrammatically a can forming machine 10 used in the production of cylindrical hollow can or container bodies 12. Machine 10 includes a welding arm or, a stubhorn 14 which acts as a mandrel around which can bodies 12 are formed as they move in the downstream direction over welding arm 14. Can bodies 12 are formed from metal blanks 16 which are moved longitudinally along a predetermined path over welding arm 14 from a magazine by conventional means, such as lugs (not shown) of a chain conveyor (not shown). These lugs engage the rear edge of metal blanks 16 and push them along welding arm 14 while they are formed into a cylindrical configuration. In the final stages of movement of can bodies 12 over welding arm 14, the edges 16A and 16B of a sheet metal blank 16 forming each of can bodies 12 are butted together or overlapped at a seaming station 17. Seaming station 17 has a welding device (not shown) for welding butted or overlapped edges 16A and 16B of blank 16 together. Although the present invention is not necessarily limited to welded can seams and will function properly with cans seamed together by other means, such as adhesive or solder, the present invention is particularly designed to overcome problems encountered with powder coating the interior surfaces as well as the seams of cans that are welded together.

In a typical operation, can bodies 12 are formed over welding arm 14 at the rate of approximately 550 cans per minute. This rate varies from one can manufacturer to another, but quite commonly today averages approximately 550 can bodies per minute per line in the production of standard 3 or 3 and 3/16 inch diameter cans, typically of 4 inch length.

Seaming station 17 is located immediately upstream of powder coating station 18. As can bodies 12 move off welding arm 14, they pass over an inside powder coating station 18 where a protective coating of coating powder is applied to the interior surface of can bodies 12, including seam area 22, as shown in FIG. 2.

The coating of coating powder is electrostatically applied to the interior surface of can bodies 12 by a powder coating gun 24, which has a charging section 28 and a spray nozzle 30. Charging section 28 is substantially similar to the charging section of a Tribomatic II® model gun manufactured by Nordson Corporation of Amherst, Ohio and described in U.S. patent application Ser. No. 07/956,615, filed Oct. 5, 1992, now U.S. Pat. No. 5,344,082 which is also hereby incorporated by reference in its entirety. As shown in FIG. 2, the gun 24 is secured to the downstream end of welding arm 14 so that can bodies 12 pass over gun 24 just after to moving off of welding arm 14.

Figure 2:
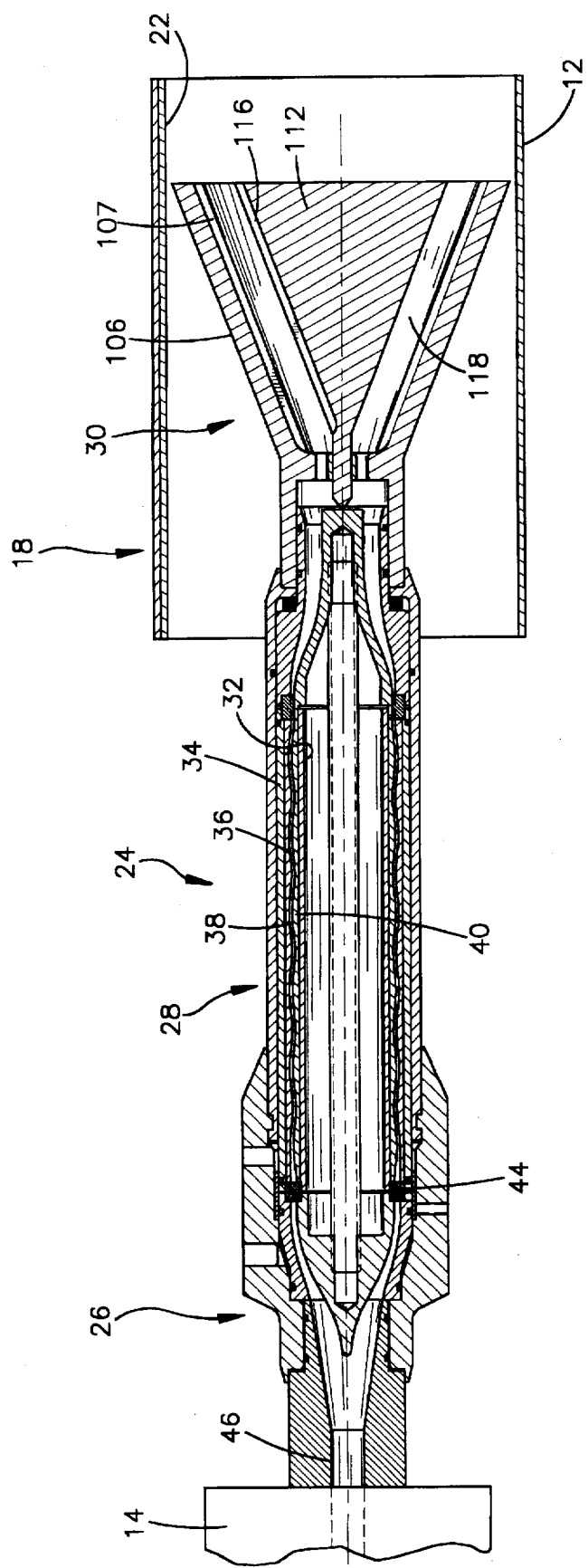
FIG. 2 is an enlarged side elevational view, partly in cross section, of a powder spray gun used to apply the coating powder to the interior surface of a welded can body, wherein the spray gun is mounted at one end to a welding arm and has a nozzle attached to the opposite end.

Gun 24, as shown in FIG. 2, includes an inlet section 26 for spreading the powder flow out into an annular ring, a charging section 28 located directly adjacent and downstream from inlet section 26, and a spray head or nozzle 30 at the outlet of charging section 28 for spraying the charged powder. Charging section 28 has an inner core 32 removably positioned within a hollow outer cylinder 34 to form an annular gap 36 therebetween. Both outer cylinder 34 and inner core 32 have undulating or wavy cylindrical charging surfaces 38, 40, respectively, made of an electrically insulating material. The annular gap 36 between charging surfaces 38, 40 provides a tortuous path through which the powder flows. This tortuous path enhances powder contact with the charging surfaces and increases the tribo-electric charge imparted to the powder. Electrical grounding is provided by surface conduction along the electrically insulating material forming charging section 28 to a ground ring 44, located outside the powder path, and then through a ground wire (not shown) passing back through welding arm 14 to the controls (not shown) for the gun. Once the powder is tribo-electrically charged in charging section 28, it is sprayed through nozzle 30 (later described).

A principle feature of this invention relates to the ability to deliver a high enough flow rate of coating powder through the small diameter passage 46, which is provided through the welding arm 14. This passage typically has a diameter of about 6 mm. A high enough flow rate is necessary to enable system 10 to spray a powder coating on the entire interior surface of hollow can 12 with the cans 12 moving at high speed.

As best seen in FIG. 1, the powder is originally supplied from a fluidizing powder hopper 52. Hopper 52 receives powder through cyclone 56 and rotary sieve 58, as discussed in more detail below. Fluidizing air is directed into a plenum at the bottom of hopper 52 and up through a fluidizing plate to fluidize the powder so that it can be pumped as air-entrained powder by a pump 62 from an outlet of fluidizing bed hopper 52 through outlet conduit 64 to a powder densifier 70. Alternatively, the powder could be delivered from a nonfluidized auger driven hopper to the pump. The excess air from fluidized hopper 52 is vented through an exhaust line 61 to a cartridge filter collector 59, as discussed in more detail below, or to a filter unit (not shown) where the air is separated from any powder materials exhausted in the vent air, and the collected powder material is scrapped.

Rotary sieve 58 can be the sieve described in U.S. Pat. No. 3,963,608, which is hereby incorporated by reference in its entirety. Rotary sieve 58 can also be a rotary sieve available from Nordson Corporation of Amherst, OH as part number 249,450. Alternatively, an ultrasonic vibratory sieve could be used to sieve the powder. Sieve 58 receives powder from cyclone separator 56 and separates the powder into particles which pass through a screen into powder hopper 52 and large clumps of powder or impurities which are retained within the screen and removed through a discharge outlet (not shown). Cyclone separator 56 is a cyclone separator like the cyclone separator described in U.S. Pat. No. 4,710,286, which is hereby incorporated by reference in its entirety. Cyclone separator 56 receives through tangential inlets on its upper casing air-entrained powder from various sources. New, or virgin powder, is received at one inlet through line 54 as a powder and air mixture. Another powder and air mixture is received through a second inlet through line 78 from densifier 70 (later described). A third powder and air mixture is received through a third inlet through line 57 from collector 59 (later described). Cyclone separator 56 swirls the transport air and powder mixture from each of the inlets in a cylinder so that the air is separated from the powder in a known manner with the powder particles falling to the bottom of the separator and into the rotary sieve 58, and the transport air as well as some of the finer powder particles exhausted through line 63 to cartridge filter collector 59.

Once the powder has been delivered from cyclone 56 into sieve 58 and from sieve 58 into hopper 52, it is fluidized in hopper 52 as previously described and pumped by pump 62 to densifier 70. Densifier 70 is used to ensure that a high enough flow rate of powder is delivered through the narrow passage of welding arm 14 to effectively coat entire can interiors at high speed. Powder densifier 70 is disposed just upstream from welding arm 14 and is used in the delivery system to concentrate the powder by removing transport air from the powder flow. The densifier 70, as shown in FIG. 5, includes a densifier body 71 with a flow passage 72 extending longitudinally therethrough. Flow passage 72 has an inlet section 73 adapted to be connected by conduit 64 to powder pump 62 of fluidizing powder hopper 52. Directly adjacent and downstream from inlet section 73 is a vented section 74 having an inside diameter which is substantially identical to the inside diameter of conduit 64 mounted in inlet opening 73. A vent passage 76, see also FIG. 6, extends through the wall of densifier body 71 to vented section 74 and is connected by vent line 78 to an inlet of cyclone 56. Vent line 78 and conduit 64 can be attached to densifier 70 by appropriate connections. While vent passage 76 is shown as extending vertically upwards from densifier body 71 in both FIGS. 1 and 5, it is within the terms of the invention to orient it downwardly or in any other direction. Just downstream of vent section 74, is a convergent section 80 of flow passage 72 which terminates in an outlet section 82. A delivery conduit 84 is connected to outlet section 82 for delivery of concentrated powder from densifier 70 to a powder flow passage 46 extending through welding arm 14 into the inlet section 26 of gun 24.

In operation, as the flow of air-entrained powder moves through the vent section 74 of densifier 70, the portion of air-entrained powder towards the center of section 74 moves faster than the air-entrained powder closer to the interior wall surface 85 of section 74 because of the friction created by the movement of the air-entrained powder against the interior wall surface. While both air and powder are vented out of section 74, more air than powder is naturally drawn off through vent 76. This occurs because the mass of the powder, having a greater momentum than that of the air, naturally continues to move downstream past vent 76 and into the convergent section 80. However, when the air encounters the constriction of convergent section 80, it naturally escapes from section 72 through the easiest flow path, i.e. through vent opening 76. Of course, powder is still mixed with the air which is bled off through opening 76, but the powder concentration relative to the air bled off through vent 76 is relatively low. On the other hand, the powder concentration relative to the air which passes through outlet 82 is relatively high.

Typically inlet 73 of densifier 70 can be connected to a conduit which in the present preferred embodiment has an inside diameter which is about three times larger than the inside diameter of the conduit connected to outlet section 82. For example, if gun 24 is used to coat the entire interior surface of a hollow can 12 the inside diameter of conduit 64 would be about 18 mm. and the inside diameter of conduit 84 would be about 6 mm. In the case where gun 24 is used to only coat a stripe across the welded seam section 22 of can 12, the inside diameter of conduit 64 would be about 12 mm. and the inside diameter of conduit 84 would be about 4 mm.

During the operation of densifier 70, approximately 45 to about 55 percent and preferably about 50 percent of the powder in the air-entrained powder flowing into densifier 70 is bled off through vent 76 and directed through line 78 into cyclone separator 56. Along with the powder, about 75 to about 85 percent and preferably about 80 percent of the transport air is bled off through vent 76 and directed through line 78 to separator cyclone 56. The result is that about 50 percent of the original powder and about 20 percent of the original air of the air-entrained powder flow, which is pumped by pump 62 from powder hopper 52 through line 64, is sent through welding arm 14 into nozzle 30 to be sprayed against the interior surfaces of can 12.

The purpose of the densifier 70 is to increase the flow rate of the coating powder flowing into gun 24 without increasing the volume of air in which the powder is entrained. The ability to increase the flow rate of powder being sprayed from the spray head 30 of gun 24 is an important feature of the invention since it enables the entire interior surface of a hollow can 12 to be coated by coating powder conveyed through welding arm 14 as the cans are being rapidly formed and transported downstream.

After the air-entrained powder exits densifier 70 and conduit 84, it flows through a passage 46 in welding arm 14, into a charging section 28 and finally is sprayed through a suitable nozzle 30, to be described in detail below, into the confined area of a hollow can body 12. Usually, the vast majority of the delivered air-entrained powder becomes electrostatically attached to the interior surface of can 12 and then fused in situ within an oven (not shown) located downstream from the system 10. Powder particles which do not adhere to the interior surfaces of the cans, will escape out the gaps between the cans and are collected in a collection hood 94 which is located adjacent nozzle 30 outside of the path of the can bodies as shown in FIG. 1.

As shown in FIG. 1, a return line 96 returns the collected powder from collection hood 94 to cartridge filter collector 59. Collector 59 can be a conventional cartridge filter type dust collector such as is shown in U.S. Pat. No. 4,218,227 which is hereby incorporated by reference in its entirety. The powder is separated from the air by the cartridge filters which are connected to a fan to draw the oversprayed powder against the filters where the powder is separated from the air. The cartridge filters are periodically reverse pulsed to knock the powder which has been drawn onto the outside of the filters down into the recovery hopper in the bottom of the collector. The powder can then be fluidized in the recovery hopper by means of an air plenum and fluidizing plate in the conventional manner, and then pumped by a powder pump 98 through a conduit 57 to cyclone 56. The cyclone separator 56, as previously discussed, separates the powder from the air and delivers the separated powder through sieve 58 to hopper 52. It is also, within the terms of the invention, to simply collect the powder from cartridge filter collector 59 and dispose of it as waste.

As shown in FIG. 1, in addition to line 36 which carries oversprayed powder into collector 59 under the force of the fan (not shown) which is associated with collector 59, lines 61 and 63 also return powder to collector 59. Line 61 is the vent line from supply hopper 52 which will include some fine particles. Line 63 is the air exhaust line from cyclone 56 which will also include some fine powder particles. The collector 59 separates the fine particles introduced through lines 61 and 63 from the transport air and returns these particles to cyclone 56 where they can be returned to feed hopper 52 through sieve 58. Thus the system, in the preferred embodiment, comprises a completely closed system where all particles which do not initially adhere to the can are ultimately recycled back to the spray gun for reapplication into a can.

Figure 3:
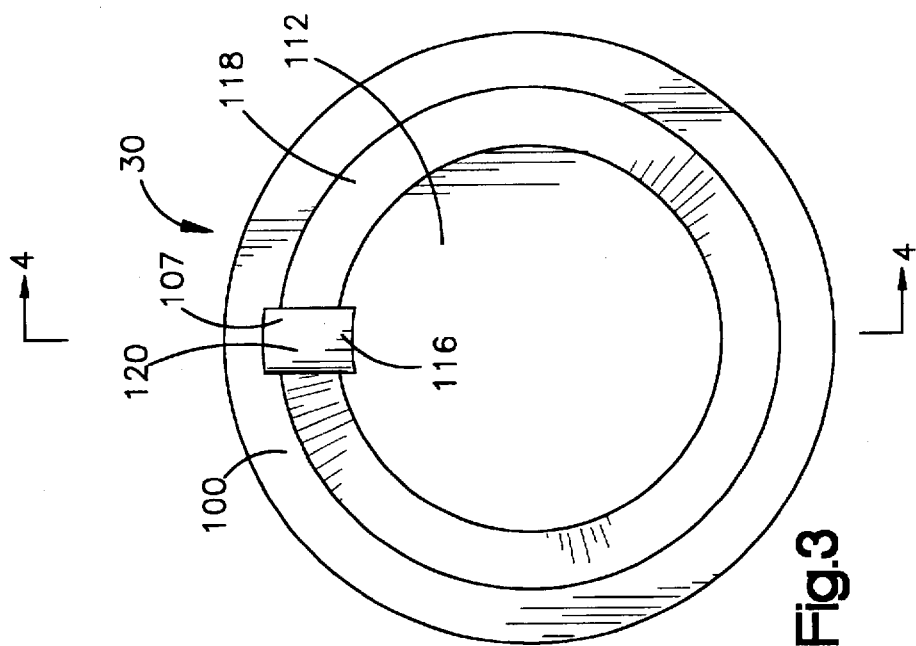
FIG. 3 is front elevational view of the nozzle shown in FIG. 2.
Figure 4:
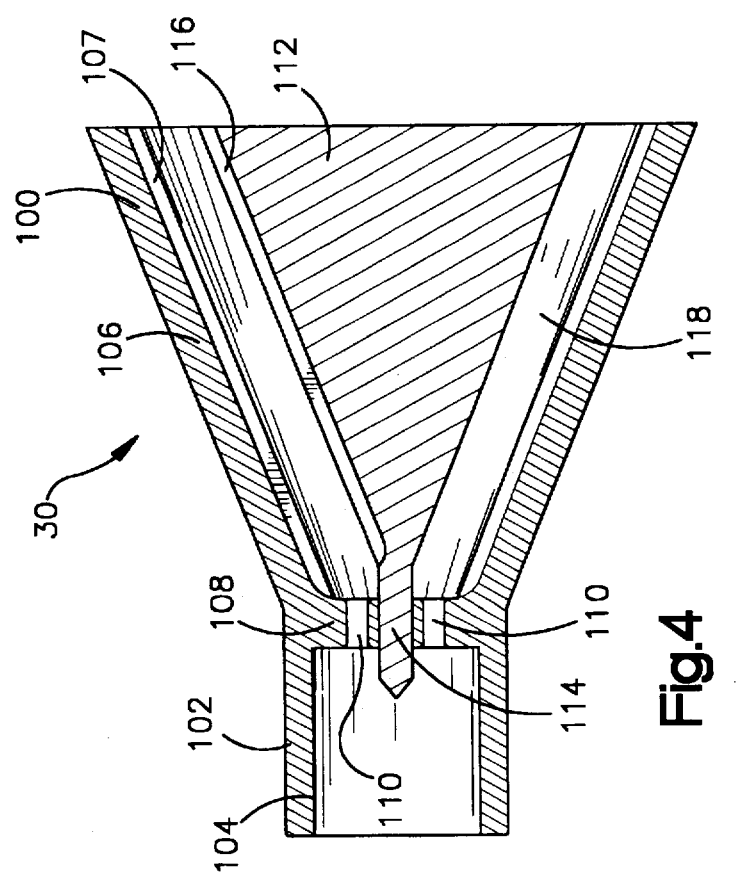
FIG. 4 is a side elevational view taken along line 4—4 of FIG. 3.

Another important aspect of the present invention relates to nozzle 30, as shown in FIGS. 3 and 4. Nozzle 30 is comprised of a shroud 100 and deflector 112. The shroud 100 has an inlet section 102 with an inlet opening 104 that is adapted to be secured to the outlet of charging section 28 as shown in FIG. 2. A diverging cone-shaped outlet section 106 extends outward from the inlet section 102. A cylindrical wall 108 at the downstream end of inlet section 102 has a plurality of equally spaced throughbores 110 to allow powder flow from inlet section 102 to outlet section 106. The shroud 100 can include an elongated notch 107 which extends the length of the shroud, as shown in FIG. 4. The deflector 112 can be cone shaped with cylindrical end section 114 which is adapted to be threadably secured to shroud 100 such as through an internally threaded opening in wall 108. Deflector 112 can be formed of a solid piece of material, such as plastic, and have a notch 116 which extends the length of the deflector and is positioned to face notch 107 when the deflector is assembled in shroud 100.

During operation of system 10, the concentrated and charged air-entrained powder exits charging section 28 and travels through inlet openings 110 and then through the cone-shaped space 118 which is formed between deflector 112 and shroud 100 when the nozzle 30 is assembled. The result is that the air-entrained powder is sprayed from the entire 360 degree circumference of the front of nozzle 30 so that the entire interior surface of the can be evenly coated. In addition, the notches 107 and 116 form a generally rectangularly shaped opening 120 which is larger than the remaining portion of the annular opening 118. The opening 120 is aligned opposite the welded seam section 22 of can 12 so that a thicker stripe of powder material is applied to the welded seam section as compared to the remainder of the can for reasons as discussed hereinbefore.

While the powder densifier 70 is effective to increase the ratio of powder to air being sprayed from nozzle 30, an alternative powder densifier 130 which is thought to further increase the ratio of powder to air is also disclosed. Densifier 130, as shown in FIG. 7, includes densifier body 132 with a flow passage 134 extending therethrough. A vented inlet member 136 is mounted against the inlet opening 138 of flow passage 134. Inlet member 136 has an inlet opening 140 into which a conduit 64 is secured. Inlet member 136 has a downstream vent section 142 with a larger inside diameter than the inlet opening 140. Preferably, the conduit 64 extends somewhat into inlet section 136 as shown. Vent passages 143 extend through the wall of inlet member 136 and are in communication with the vent section 142 and can be connected by hoses to cyclone separator 56. Within the inlet 138 is mounted a nozzle 144 which extends downstream into flow passage 134. Nozzle 144 has a slightly convergent through passage 146 and an outlet opening 148. Vents 150 are provided through the walls of densifier body 132 at a location upstream from the position of the outlet 148 of nozzle 144. Vents 150 can be connected to cyclone separator 56 by conventional means such as a hose. Just downstream from the vent openings 150, the vent section 142 connects to a convergent section 152 which in turn connects to an outlet 154. Outlet section 154 can be connected to delivery conduit 84 for directing the concentrated air-entrained powder into a powder flow passage 46 extending through welding arm 14 for delivery to the inlet of charging gun 24.

In operation, the air-entrained powder flowing through conduit 64 expands in section 142 and forms a turbulent frictional outer boundary layer and laminar inner layer. The frictional boundary layer is stripped off through the vent openings 143 which provide the easiest flow path from section 142 since the inner laminar flow layer is moving into the restricted opening of nozzle 144. The remainder of the air-entrained powder flows through the nozzle 144. As the flow exits from opening 148 of nozzle 144 and enters the convergent section 152, the turbulent portion of the powder flow which is formed at the edges of nozzle opening 148, is stripped off through the vent openings 150 and returned to cyclone separator 56. The remaining air-entrained powder flow, which is essentially laminar, travels down convergent passage 152 and through outlet section 154 into conduit 84.

The basic principal of the densifier device 130 of FIG. 7 is to concentrate powder flow through the center of the device and strip off transport air from the walls of the device. In this way the rates of powder to air can be increased as the powder air mixture flows through device 130 from inlet conduit 64 to outlet conduit 84.

While densifier 130 of FIG. 7 and densifier 70 of FIG. 5 have been disclosed for use in concentrating powder flow prior to passing that powder flow through the welding arm of a can manufacturing machine, the densifiers 70 and 130 could also be used in other powder coating operations.

STRIPING NOZZLE

While nozzle 30 is effective for spraying the entire interior surface of a can body 12, it is also within the scope of the invention to provide a striping nozzle 170 for applying the coating powder only to the welded seam area 22 of a can body 12. The nozzle 170, as shown in FIGS. 8–11, is secured to one end of a mounting bracket 176. A conventional voltage multiplier 178 of the type commonly used for electrostatic spraying is secured to the other end of mounting bracket 176. Both nozzle 170 and multiplier 178 are installed within a slot 201 formed into the end of the welding arm 14. A high voltage cable 179, as described below, provides an electrically insulated conductive path, between multiplier 178 and nozzle 170. A supply of air-entrained powder is provided through a conduit 181 and excess powder from within the cans is returned through conduit 183 to collector 59.

Figure 11:
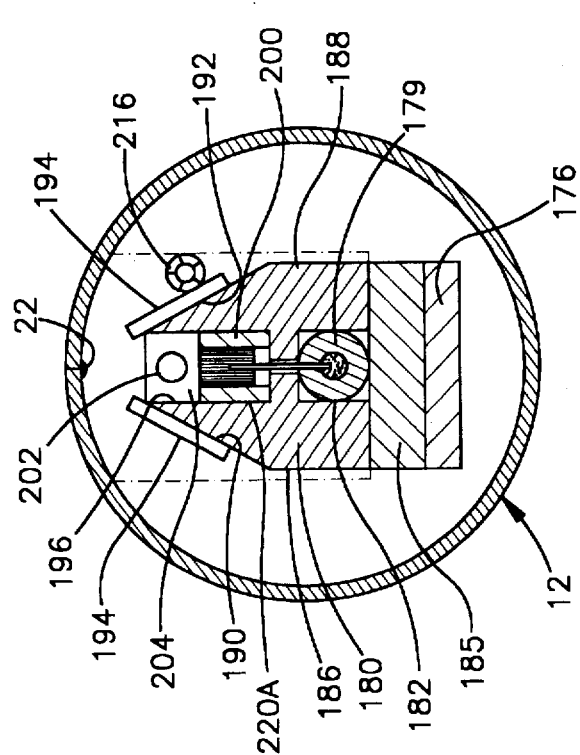
FIG. 11 is a cross sectional view of the nozzle taken along line 11—11 of FIG. 8.

Striping nozzle 170 has a rectangular base member 185 which is mounted on bracket 176. If necessary nozzle 170 can be supported by rollers which roll over the interior surfaces of the cans before they are coated. Rollers could also be employed to support the charging section 28 and or spray nozzle 30 of the FIG. 2 embodiment prior to the point where powder is applied to the cans. A nozzle body member 180 is secured to base member 185. Body member 180 has two vertical sidewalls, 186 and 188 which intersect converging sidewalls 190 and 192. A pair of brushes 194 are mounted on the converging walls 190 and 192 of body member 180. The brushes are provided to internally engage the can bodies 12 on opposite sides of the seam area 22 to contain the powder along seam area 22. An elongated lower rectangular slot 182 opens onto the lower surface of member 180 and is enclosed by base member 185. Slot 182 receives cable 179 which in turn is connected to voltage multiplier 178. Member 180 also has an upper slot 196 which extends the length of the body member 180, is generally rectangular as shown in FIG. 11, and is opened along the top of body member 180.

An elongated powder flow insert 200 is disposed within slot 196. The insert 200 has a powder supply bore 202 at one end which is connected to conduit 181 to direct air-entrained powder into coating section 204. Conduit 181 is connected to the powder supply passage 46 formed through welding arm 14. Coating section 204 is formed by an upward facing surface 205 which extends longitudinally along a central section of nozzle insert 200. Coating section 204 has side walls formed by the portion of the side walls of upper slot 196 above insert 200 and the space between brushes 194 and the can 12. An outlet section 206 of insert 200 begins where surface 205 intersects a downward ramp 208 to create a flow channel 211 with an upper surface 210 formed in the insert 200. Outlet section 206 has a return throughbore 212 with an outlet opening 214 which can be connected to a conduit 216 to recycle excess powder as discussed in more detail below. A plurality of throughbores 218A, 218B, 218C connect flow channel 211 with the space 217 between the can 12 and the nozzle 170 to return oversprayed powder within can body 12 to flow channel 211. A plurality of electrode bores 220A, 220B and 220C which open to coating section 204 are provided in the insert 200 in spaced relation to each other.

Figure 10:
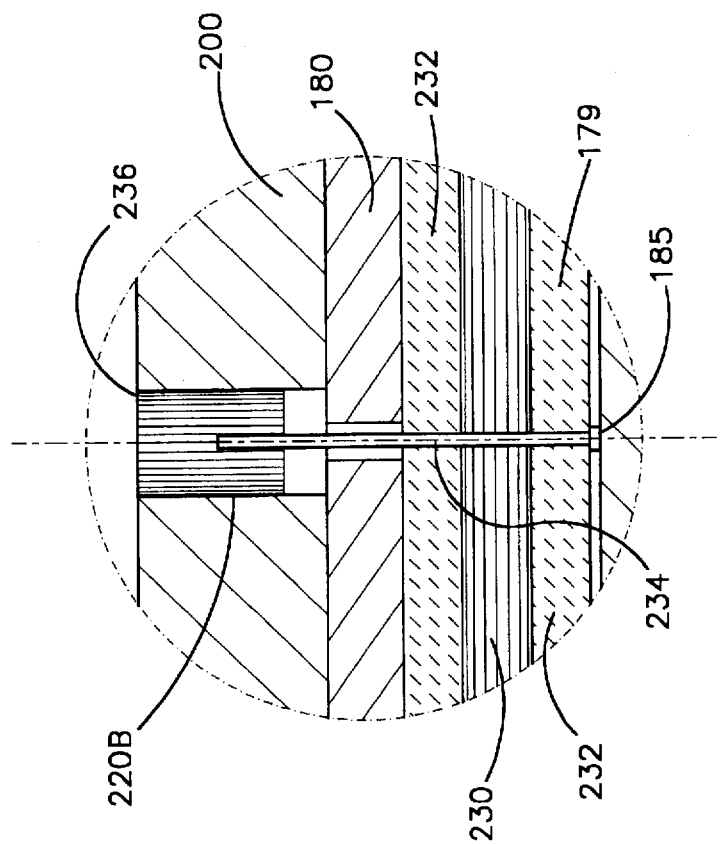
FIG. 10 is an enlarged detail view showing the details of an electrode in FIG. 8.

Finally, an important aspect of nozzle 170 relates to the electrode charging assembly 219. In a preferred form of the invention, cable 179 is connected to a voltage multiplier 178 which in turn is connected to a low voltage control line (not shown) which passes through welding arm 14 to a controller. Cable 179 is snugly secured within slot 182, as generally shown in FIGS. 8 and 11. The length of electrical cable 179, which comprises an electrical conductor 230 surrounded by insulation layer 232, is mounted within slot 182. Electrical conductor 230 is a continuous resistive core formed of a bundle of continuous silicon carbide fibers which conduct a charge but also have a resistivity which limits the rate of capacitive discharge, as discussed in U.S. Pat. No. 5,154,358 to Nordson Corporation which is hereby incorporated by reference in its entirety. As shown in FIG. 10, conductive pins 234 are inserted through cable 179 and into the conductor 230. Each of the pins projects up through body member 180 and into a plug of silicon carbide fibers 236 which are disposed in the bores 220A, 220B, 220C. Silicon carbide fibers 236, which are similar to those described in U.S. Pat. No. 4,819,879 to Nordson Corporation, which is hereby incorporated by reference in its entirety herein, enable the electrostatic charge to be transmitted from the conductor 230 through pins 234 so that each of the silicon carbide fiber ends, which project up into the powder flow passage 204, comprise a charging electrode. In this way, multipoint charging electrodes are produced in that each of the fiber ends serves as a point electrode and charges the coating powder flowing through coating section 204. Moreover, these point electrodes are each formed from a material having sufficient resistivity to prevent a significant capacitive discharge (i.e. a spark) to the can.

In operation, the air-entrained powder, which is preferably directed through a densifier 70, 130 of the type described hereinbefore, flows through passage 46 and conduit 181, into supply passage 202 and then into coating section 204. The high voltage electrostatic energy supplied by cable 179 to the silicon carbide fibers 236 vis-a-vis the electrical path previously described, produces a corona discharge at the multitude of resistive material fiber ends located within each electrode bore 220A, 220B, 220C which causes electrostatic charge to be imparted to the stream of air-entrained powder as it flows through the sections 204 and 211. The charged powder, which is confined to the coating sections 204 and 211 is attracted to welded seam area 22 of can 12 which is electrically grounded to the conveyor. Then, the remaining air-entrained powder, which does not adhere to the can 12, flows through return passage 211 and into bore 212 to be transferred through tube 216 to collector 59 and powder which escapes between cans is collected through line 96.

Thus, the invention as described provides for supplying a concentrated powder flow through the welding arm of a can manufacturing machine for coating the entire interior of the can or just the welded seam. While the densifier was disclosed for use in can coating, it is also useable in other powder coating applications. Moreover, while the spray nozzles of FIGS. 2 and 8 are optimally used with the densifiers of FIGS. 5 or 7, they may also be used without densifiers. While tribo-charging has been shown for coating the interior of the can and corona charging for charging the powder applied to the stripe, tribo-charging could be used for applying powder to the stripe and corona charging could be used for coating the entire interior of the can.

While the above described embodiment of the can forming machine 10 illustrated diagrammatically in FIG. 1 provides an effective means of powder coating the interior surfaces as well as the seems of the can bodies 12 formed over the welding arm 14, under certain operating conditions, it is desirable to increase the velocity of the air-entrained powder flow through the welding arm to better charge the powder as it flows through the frictional charge path of the spray gun and to produce a better shaped spray pattern. In addition, the increased velocity provides for a smoother flow of powder through the densifier which previously clogged under some conditions before the improvement was made.

Figure 12:
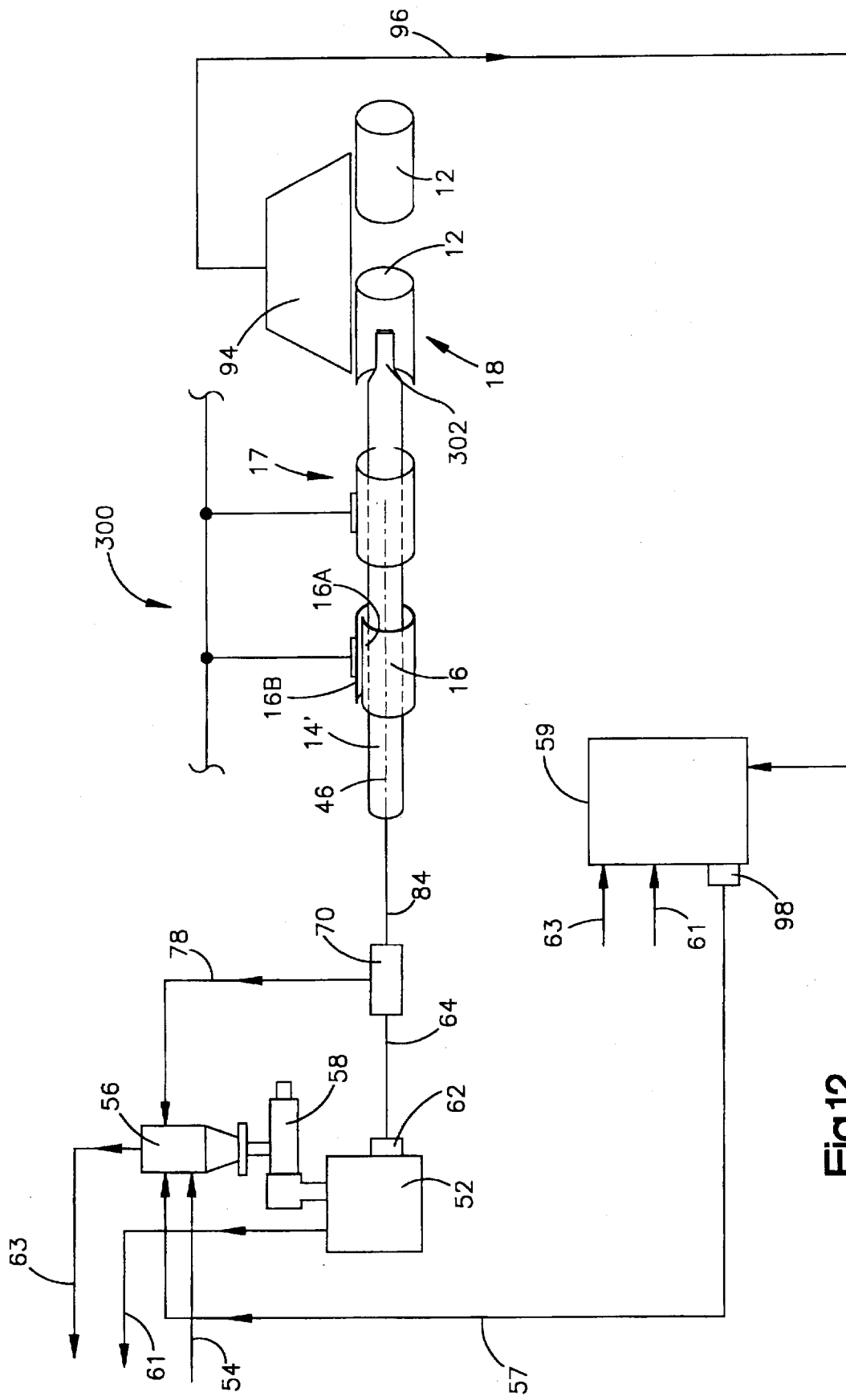
FIG. 12 is a schematic illustration of a can body production line which includes a second embodiment of a system for applying coating powder to the interior surface of a welded hollow can body in accordance with the present invention.

Referring to FIGS. 12 and 13, there is illustrated diagrammatically a can forming machine 300 which is substantially identical to can forming machine 10 illustrated in FIG. 1 with the exception of a spray gun assembly 302 including an amplifier 304, and diffuser 306, and spray gun 308. The amplifier 304 and diffuser 306 are mounted between the end of welding arm 14' and the spray gun 308. Throughout the specification, primed and double numbers represent structural elements which are substantially identical to structural elements represented by the same unprimed number.

AMPLIFIER

One feature of the invention is the construction and placement of air amplifier 304 at the end 310 of welding arm 14'. Air amplifier 304, as illustrated in FIGS. 14 and 15, includes an amplifier body 312 having a throughbore 314 with an inlet section 316 which intersects an outlet section 318. The inlet section 316 is formed with a cylindrical inner surface 317 having a first diameter. The outlet section 318 forms the throat of amplifier 304 and has a frustroconically-shaped interior surface 319 with the smaller inlet diameter intersecting the inlet section 316 to form a shoulder 320 at the intersection thereof. An air passage 322, formed in the inlet section 316 of amplifier body 312, is connected by an inlet fitting 326 to an airline 324. Air line 324 extends back through welding arm 14' and is connected to a source of compressed air that is transferred to air passage 322.

An amplifier insert element 328 with an inlet portion 330 and an outlet portion 332 both having cylindrical outer surfaces that are sized to provide a friction or interference fit with the cylindrical interior surface 317 of throughbore 314 through amplifier body 12. Insert element 328 is securely mounted within amplifier body 312 so that its end surface 334 abuts against shoulder 320. An intermediate portion 336 disposed between inlet portion 330 and outlet portion 332 of insert element 328 has an outer surface with a smaller diameter than the inlet or outlet portions 330 or 332, respectively, to form a plenum section 338, as shown in FIG. 13, which receives compressed air from air passage 322. A plurality of holes 339, which extend through the outlet portion 332 between intermediate portion 336 and end surface 334, are spaced on radial lines from a central axis 340 at equal angles to each other. For example, in the preferred embodiment shown in FIG. 15, eight holes are provided at an angle of 45° with respect to each other.

In amplifier 304, holes 339 direct jets of air into divergent outlet section 318. The jets of air produce a suction force on the flow of air-entrained powder being transferred through powder line 84' which extends through weld arm 14' from densifier 70. The powder is pulled through the divergent throughbore 346 and into the divergent outlet section 318. Once the air-entrained powder is flowing through the outlet section 318 of amplifier 304, it mixes with the compressed air flowing through holes 339 and the velocity of the powder flow increases as the air-entrained powder flows into diffuser 306.

DIFFUSER

Diffuser 306, as illustrated in FIGS. 13, 16, and 17, includes a diffuser body 350 with an inlet section 352, an outlet section 354, and an intermediate section 356, interposed between inlet section 352 and outlet section 354. A throughbore 358 through diffuser body 350 has threaded portions 360 and 362 in the inlet and outlet sections 352 and 354, respectively, as shown in FIG. 17. Assembly 302 as shown in FIG. 13, includes amplifier 304 mounted to weld arm 14' and diffuser 306 threadably mounted to amplifier 304 by screwing the internally threaded portion 360 of diffuser 306 onto the externally threaded portion 364 of the amplifier.

Diffuser 306 has installed within it, as shown in FIG. 13, a distributor mount 364. Distributor mount 364 has a disk shaped central section 366 with external threads about its outer peripheral surface that thread into the internally threaded portion 362 of diffuser body 350. An annular groove 368 about an outer edge of central section 366 seats one end of a porous sleeve 370, typically of a porous ceramic material. Ceramic sleeve 370 is seated at its other end in an annular groove 372 formed in the end surface 374 of amplifier body 312. Distributor mount 364 has a threaded end portion 376 onto which is threadably mounted a cylindrical flow distributor 378 having a pointed conical end 380. Distributor mount 364 has a plurality of throughholes 382 in central section 366 which are spaced apart an equal amount of degrees such as about 30° as shown in FIG. 16. Preferably, there is no hole at the bottom, 6o'clock position, of distributor mount 364 for the reasons described herein below. Diffuser 306 has a compressed air inlet 384 within inlet section 352. A compressed air line 386 which extends through welding arm 14' (See FIG. 13) is connected to an air inlet 388 mounted to compressed air inlet 384.

The compressed air passes through inlet 384 and into a plenum 390 between the intermediate section 356 of diffuser body 350 and porous sleeve 370. The compressed air then passes through porous sleeve 370 into the interior of diffuser 306 to mix with the air-entrained powder from amplifier 304 to more evenly distribute the powder in the air. A portion of the compressed air in plenum 390 also passes through a slot 392 between outlet section 354 of diffuser 306 and disc shaped portion 336 of distributor mount 364 to provide a nozzle cleaning air flow. The nozzle cleaning air flows from slot 392 into an air passage 394 up through distributor mount 364 at the 6 o'clock position. The nozzle cleaning air continues to flow through passage 396 and out of opening 398 about which a seal ring, such as an o-ring 400, is seated. The compressed air then flows into gun tube 456 as described below.

In the operation of diffuser 306, air-entrained powder from throat 348 of amplifier 304 passes into diffuser 306 and in particular, through a powder path defined by the porous ceramic sleeve 370. Compressed air passes through porous sleeve 370 and into the interior of diffuser 306. The air introduced into the diffuser 306 thoroughly mixes the air-entrained powder so that the powder is more evenly dispersed in the air and the tendency for the powder to concentrate on the bottom of the flow passage is significantly reduced. Also by homogenizing the powder before it enters the charging section of gun 308, improved charging of the powder results and a more even spray pattern is produced.

The flow distributor 378 located along the axial centerline of diffuser 306 helps distribute the powder radially. The distributor 378 being Teflon, is constructed of the same material as the charging section of gun 308. Therefore, flow distributor 378 precharges the powder, tribo-electrically. The powder being precharged and distributed radially then flows through the holes 382 in distributor mount 364. Holes 382 evenly distribute the powder flow around the annular flow passage 402 between the gun collar 404, described in more detail below, and outlet section 405 of distributor mount 364. Since there is no hole 382 at the bottom of distributor mount 364, the powder is prevented from concentrating along the bottom of gun 308 because there is no powder flow passage in this location. Therefore, the tendency of powder to concentrate because of gravity along the bottom of flow passage 402 is reduced.

GROUND RINGS

Before describing the flow of powder into gun 308, ground rings 410A and 410B which are placed on opposite sides of diffuser 306 and shown in FIGS. 13 and 17A will be described. Each of the ground rings, is constructed of an electrically conductive material such as brass and has an inner diameter sized for mounting about amplifier body 312 and diffuser 404 as shown in FIG. 13. Each of the ground rings 410A, 410B have a threaded throughbore 411 to receive a screw for attaching a ground wire 418 which extends from ground ring 420 of gun 308 (later described), to ground ring 410B, across diffuser 306 to ground ring 410A, across amplifier 304 and through welding arm 14' to a ground connection. Since precharging of the powder occurs in diffuser 306 because of the flow across Teflon flow distributor 378, charge builds up within diffuser 306 and a significant electric arc can be produced from the diffuser to a nearby ground reference such as a can or an operator. To eliminate this potential problem, ground rings 410A and 410B are installed. The electrical charge generated within diffuser 306 flows along the various surfaces of diffuser 306 to the opposite ends thereof and then into the ground rings of 410A, 410B. If these ground rings were not provided, the charge would accumulate within diffuser 306 until it eventually arced from one end of the diffuser or the other to an operator or grounded object such as a can. As will be explained in more detail later on, these ground rings are grounded back through weld arm 14' together with the ground ring 420 for gun 308 to prevent both the gun 308 and diffuser 306 from producing an electric arc.

POWDER COATING GUN

Returning to the flow of powder from diffuser 306 into gun 308, the powder being electrostatically applied to the interior surface of the hollow container bodies by powder coating gun 308 is charged by gun 308, as shown in FIG. 13, and sprayed from spray nozzle deflector 430. The charging section 432 of gun 308 is substantially similar to the charging section of a Tribomatic II® model gun described in U.S. Pat. No. 5,344,082, which is hereby incorporated by reference in its entirety. Gun 308 includes a gun collar 404 which mounts charging section 432 to diffuser 306. The distributor mount 364 extends into throughbore 406 of gun collar 404 and forms an annular flow passage 402 therebetween. Distributor mount 364 abuts against inlet distributor 433 so that the powder flow through gun collar 404 forms an annular ring which then passes through charging section 432 located directly adjacent and downstream from inlet distributor 433.

Charging section 432 has an inner core 434 removably positioned within a hollow outer cylinder 438 to form an annular gap 436 therebetween. Both outer cylinder 438 and inner core 434 have undulating or wavy cylindrical charging surfaces 440, 442, respectively, made of an electrically insulating material. The annular gap 436 between charging surfaces 440, 442 provides a tortuous path through which the powder flows. This tortuous path enhances powder contact with the charging surfaces and increases the tribo-electric charge imparted to the powder. Electrical grounding is provided by surface conduction along the electrically insulating material forming charging section 432 to a ground ring 420, located outside the powder path. Ground wire 418 is connected to ground ring 420 and to ground rings 410B, 410A. Ground wire 418 passes through welding arm 14' to ground. Once the powder is tribo-electrically charged in charging section 432, it is sprayed through nozzle deflector 430 (later described).

Another important feature of the present invention relates to the provision of a flow path for the flow of nozzle cleaning air from passageway 396 in distributor mount 364 and into an opening 450 (See FIG. 18) through forward wall 452 of inlet distributor 433 which in turn is disposed in gun collar 404. An 0-ring 400 is seated on an annular shoulder 399 disposed about the outlet opening 398 of distributor mount 364. 0-ring 400 prevents leakage of the nozzle cleaning air as it flows through passage 396, and into opening 450.

Nozzle cleaning air flows from opening 450 through an air passage 462 extending through gun tube 456 as shown in FIG. 18. Gun tube 456 extends the length of gun 308 and has inlet and outlet threaded sections 458 and 460, respectively. Inlet threaded section 458 is threadably secured within the threaded throughbore 454 of inlet distributor 433. The threaded section 460 of flow tube 456 is threadably secured within a threaded bore 464 of an outlet distributor 466. As shown in FIG. 13, the outer end of threaded section 460 projects past the end wall 468 of outlet distributor 466 for threadably attaching nozzle deflector 430. End insert 472 forms a nozzle assembly 473 with nozzle deflector 430. The inner wall 470 of end insert 472 of gun 308 is spaced relative to the outer wall 474 of outlet distributor 466 to form a flow passage 476 to transfer air-entrained charged powder coating material received from changing section 432 across the outer surface 478 of nozzle deflector 430 to be sprayed into a hollow container body (not shown).

OFFSET NOZZLE

Another important aspect of the present invention is the offset nozzle deflector 430. As shown in FIGS. 18 and 19, offset nozzle deflector 430 has a rear cylindrical section 480 which is symmetrically disposed about a center line 482 extending axially through nozzle deflector 430. Nozzle deflector 430 also includes a forward section 484 having a divergent outer wall 486 which intersects a narrow cylindrical end wall 488. A front surface 491 is counter sunk into the forward section 484 and intersects a forward surface 489 of end wall 488. A center line 493 extending perpendicular to front surface 491 is offset a small amount between about 6° and 8°, and preferably about 4° from center line 482 extending through the nozzle. When nozzle deflector 430 is assembled onto end section 460 of gun tube 456 to abut against end wall 468 of outlet distributor 466, the width of the annular powder flow passage 476 between the flow surface 484 of nozzle deflector 430 and the inner wall 470 of insert 472 varies because of the offset of nozzle deflector 430. The nozzle is assembled so that when viewed from the front of the nozzle the narrowest portion of the flow passage 476 is at the 6 o'clock position, (i.e. the bottom of the nozzle) and the widest portion of the flow passage is at the twelve o'clock position (i.e. at the top of the nozzle). Therefore, a larger volume of powder exits from the top of nozzle deflector 430 than from the bottom of nozzle deflector 430. Since the welded seam of the can will be located opposite the upper portion, or twelve o'clock position of the nozzle, more powder will be sprayed onto the welded seam than of the remainder of the interior side wall of the can. This will ensure that the welded seam of the can is effectively coated with powder. In addition, by directing more of the air-entrained powder through the upper portion of flow passage 476 and across nozzle deflector 430, there is less tendency for the powder to concentrate at the bottom of the flow passage.

As shown in FIGS. 19 and 20, a circular porous disc 490 is secured within a groove 492 bounded by cylindrical end wall 488 of nozzle deflector 430. The porous disc is preferably constructed of a high density polyethylene coarse hydrophilic which allows the cleaning air from passage 462 of tube 456 to flow into the outlet section 496 of nozzle deflector 430 and through the porous disc 490.

During the operation of can forming machine 300, as shown in FIG. 13, nozzle cleaning air is supplied from a source of compressed air (not shown) through an air line 386 extending down weld arm 14'. The cleaning air then flows into air inlet 384 of diffuser body 350, exits through slot 392, and continues into passageway 396 of distributor mount 364. The nozzle cleaning air then flows through passage 462 of gun tube 456, into nozzle deflector 430 and through disc 490. The purpose of the nozzle cleaning air is to prevent powder from collecting on the front of the nozzle deflector 430. If powder were allowed to collect on the front of nozzle deflector 430, it would periodically fall off and ruin the coating of the can being powder coated.

SHAPE OF POWDER GUN ASSEMBLY

Another feature of the present invention relates to the exterior, geometric shape and size of the gun assembly 302 including gun body 308, diffuser 306, and amplifier 304. As shown in FIG. 13, gun assembly 302 has a first diameter of $D_1$ a second smaller diameter $D_2$, and a still small diameter $D_3$. The diameter $D_1$ of diffuser 306 and the diameter of gun collar 404 are substantially the same. The diameter is large enough to break up the boundary layer of air which forms on the interior surface of the can as it moves down the welding arm 14' at high speed and across diffuser 306 and gun collar 404. Throughout the specification, primed and double primed reference numerals represent structural elements which are substantially identical to structural elements represented by the same unprimed reference numerals. This boundary layer, typically a turbulent boundary layer, if not broken down could interfere with the ability of the powder being sprayed from nozzle deflector 430 to attach to the interior surface of the can. The diameter $D_1$ is large enough to prevent a large quantity of air from passing between the can and gun assembly 302 so that the thickness of the boundary layer is reduced and its strength weakened. By weakening the boundary layer, it is believed that the powder can break through the boundary layer and attach more evenly on the interior surface of the can. Typically, it is desired that the diameter $D_1$ be about 0.125 to about 0.50 inches less than the inner diameter of the can. While diameter $D_1$ allows for the formation of a thin, weak, turbulent boundary layer, providing such a narrow passageway between the gun assembly 302 and the can causes the velocity of the air of the boundary layer to increase. This in turn could cause the powder to bounce off rather than stick to the interior surface of the can. To overcome this problem, the diameter $D_2$ of the charging section 432 of gun 308 necks down at section 498 to a diameter $D_2$ less than diameter $D_1$. The result of providing a larger passageway between the can and charging section 432 is that the boundary layer is believed to further breakdown and become turbulent with the result that the powder forms a cloud that allows powder to attach to the interior of the can. It has been found that a diameter $D_2$ of between about 0.375 to about 0.625 inches less than the diameter of the interior of the can has been effective to allow the powder to form a cloud as described above. The cloud moves downstream at a velocity which allows the powder to attach to the can. More preferably, the diameter $D_2$ can be about 0.5 inches less than the diameter of the interior surface of the can. Moreover, it has been found desirable to provide even more space for the powder cloud to properly develop. Therefore, around nozzle deflector 430, at the outlet opening of gun 308 the diameter $D_3$ is about 0.625 to about 1.0 of an inch less than the diameter of the can. More preferably, the diameter $D_3$ is about 0.75 inches less than the diameter of the can. Thus, diameter $D_1$ initially breaks down the boundary layer, diameter $D_2$ further breaks down the boundary layer and allows the powder cloud to start to develop and diameter $D_3$ allows the powder cloud to further develop.

STRIPING NOZZLE WITH ELECTRODE PLATE

Figure 21:
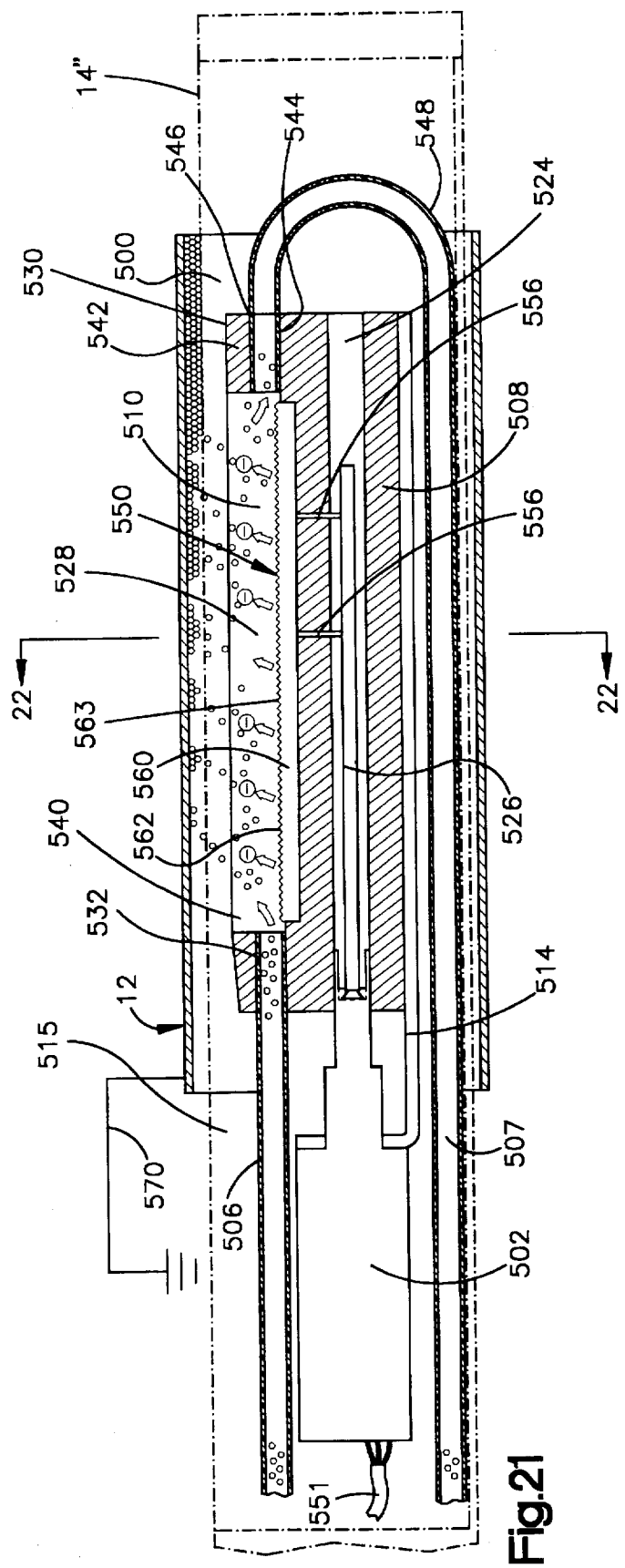
FIG. 21 is a side elevational view, partly in cross section, of one alternative embodiment of a nozzle secured to a welding arm to apply the coating powder to the welded seam of a can body in accordance with the invention.
Figure 22:
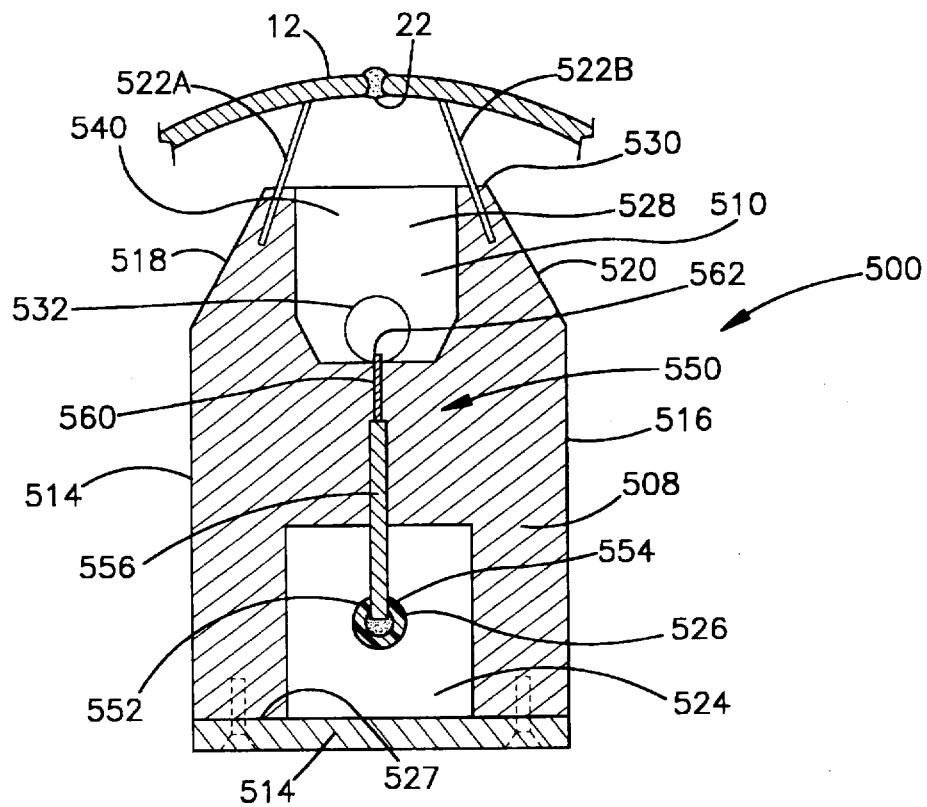
FIG. 22 is an end cross sectional view of the nozzle shown in FIG. 21 taken along line 22—22.

While striping nozzle 170, as illustrated in FIGS. 8–11, is effective for applying the powder coating to the welded seam area of the can body 12, it is also within the scope of the invention to provide an alternative embodiment incorporating a striping nozzle 500, as shown in FIGS. 21 and 22. Striping nozzle 500 is secured to a mounting bracket 514. Bracket 514 is also connected to a conventional voltage multiplier 502 of a type commonly used for electrostatic spraying. The nozzle 500 and multiplier 502 can be installed within a slot 515 formed in the end of welding arm 14". A high voltage cable 526, as described below, provides an electrical path between multiplier 502 and nozzle 500. A supply of air-entrained powder is provided through a powder supply conduit 506 which passes through welding arm 14" and excess powder from within cans 12 is returned through return conduit 507 which also passes through welding arm 14'. An electrical line is also provided through welding arm 14" to power multiplier 502. Powder coating device 500 is constructed to provide a coating over the welded seam 22 on the inside surface of a can 12 and is placed downstream but in line with a seam welder (not shown). Nozzle 500 has a nozzle body 508 which includes a nozzle opening 510 that forms a long, narrow slot in the direction of transport of can 12. Nozzle opening 510 faces the welded seam 22 on the inside surface of can body 12. Nozzle body 508 is generally constructed with a rectangular cross section and is mounted to bracket 514.

Body member 508 has two vertical sidewalls 514 and 516 (see FIG. 22) which intersect converging sidewalls 518 and 520, respectively. A pair of brushes 522A, 522B are mounted on the converging walls 518 and 520 of body member 508. Brushes 522A, 522B are provided to internally engage the can bodies 12 on opposite sides of seam area 22 to contain the powder along seam area 22. An elongated lower rectangular slot 524 opens at the lower surface 527 of member 508 and is enclosed by bracket 514. Slot 524 receives cable 526 which in turn is connected to voltage multiplier 502. Member 508 also has an upper slot 528 which extends substantially the length of the body member 508, is generally rectangular as shown in FIG. 22, and is opened at the upper end 530 of body member 508.

Body member 508 has a powder supply inlet 532 which is connected to conduit 506 to direct air-entrained powder into a coating section 540. As shown in FIG. 22, coating section 540 includes upper slot 528 and the space between brushes 522A, 522B, and the interior surface of can 12 between the brushes. Conduit 506 is connected to the powder supply passage 46 of FIG. 12 which is formed through the welding arm. A powder outlet section 542 of body member 508 has a return throughbore 544 with an outlet opening 546 which can be connected to a conduit 548 to collect excess powder.

An important aspect of nozzle 500 relates to the electrode charging assembly 550. In a preferred form of the invention, cable 526 is connected to voltage multiplier 502 which in turn is connected to a low voltage control line 551 which passes through the welding arm to a controller (not shown). Cable 526 includes an electrical conductor 552 (See FIG. 22) surrounded by insulation layer 554. Electrical conductor 552 is a continuous resistive core formed of a bundle of continuous silicon carbide fibers which conduct a charge but also have a resistivity which limits the rate of capacitive discharge, as discussed above regarding cable 179. Similar to the embodiment shown in FIG. 10, conductive pins 556 are inserted through cable 526 to make electrical contact with conductor 552.

The opposite end of conductive pins 556 are mounted to an electrode plate 560 which has a saw-like upper edge 562 with a plurality of saw-like teeth 563 that extends substantially the length of upper slot 528. Plate 560 is embedded in base 508 as shown in FIG. 22. Electrode plate 560 is made of a conductor or semi-conductor, such as metal or carbon.

In operation, cylindrical can bodies 12 with a longitudinal seam 22 welded by a seam welder is fed continuously from the upstream side of FIG. 21. The coating powder together with the carrier air is fed through powder conduit 506 and into coating section 540. The high voltage being supplied from high voltage generator 502 to the electrode plate 562 via conductor cable 526 and connecting pins 560 generates a large number of corona discharges from the large number of pointed saw-like teeth 563 on electrode plate 560. By creating a potential difference between electrode plate 560 and the can 12, which has been figuratively grounded through line 570 on FIG. 21 by the can conveyor, the coating powder passes through the electric field and is electrostatically charged so that it adheres to the interior surface of can body 12. This is corona charging of the powder rather than tribo charging of the powder as is done with the FIG. 13 embodiment.

MODIFIED COATING NOZZLE

Figure 23:
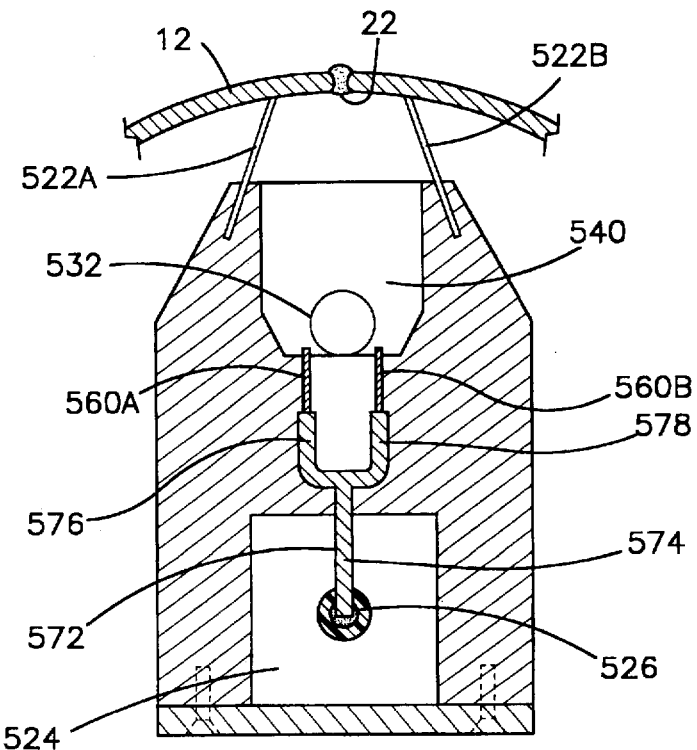
FIG. 23 is an end, cross sectional view, of a second alternative embodiment of a nozzle secured to a welding arm to apply the coating powder to the welded seam of a can body in accordance with the invention.

Referring to FIG. 23, there is illustrated a modification of powder coating nozzle device 500 wherein the single electrode plate 560 has been replaced with two electrode plates 560A and 560B which are substantially identical to plate 560 described herein before. Each of the plates 560A and 560B are connected by one or more connect pins 572, each having a lower portion 574 inserted through cable 526 to make an electrical contact with conductor 552 as previously described. Each of the connect pins 572 include two branches 576 and 578 which are attached to plates 560A and 560B, respectively. While the arrangement shown in FIG. 23 incorporates electrode plates 560A and 560B provided in two rows, the arrangement is not limited to two electrode plates but may include three or more rows which extend into the bottom wall or the side walls of upper slot 540. The added electrode plates insure chat the powder coating is charged more efficiently to obtain a more even coating of powder on the can 12.

MODIFIED OFFSET COATING NOZZLE WITH DEFLECTOR

Figure 24:
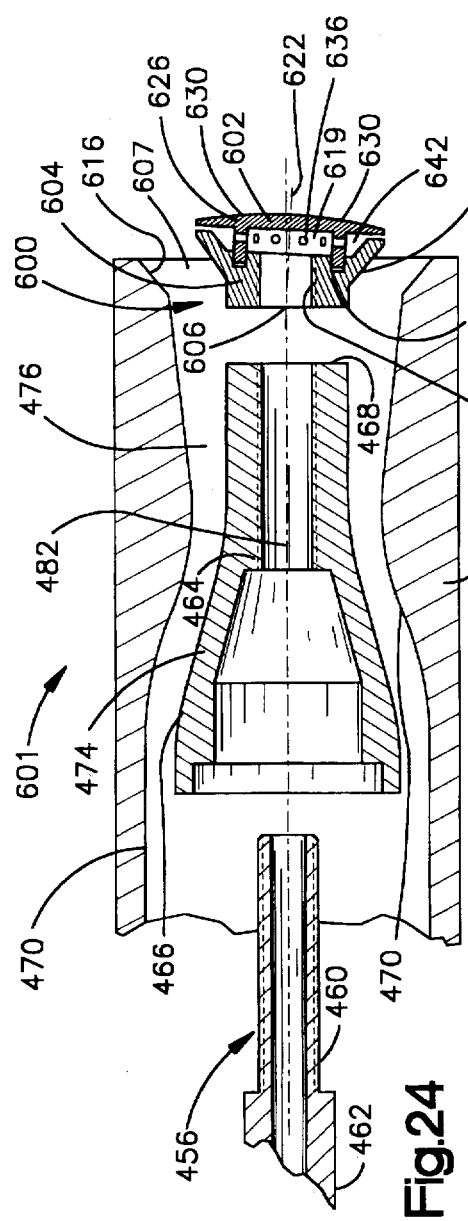
FIG. 24 is an exploded view, partly in cross section, of a flow tube which extends through a powder gun and has a distributor outlet with one alternative embodiment of an offset powder deflector with an air deflector to apply the coating powder to the interior surface of a welded can body, in accordance with the invention.

Referring to FIG. 24, there is illustrated powder deflector 600 which is similar to offset nozzle deflector 430, as shown in FIG. 13. Powder deflector 600 is a part of a nozzle assembly 601 which can be substituted for nozzle assembly 473 of powder spray gun 308. Powder deflector 600 includes an air deflector 602 mounted in powder deflector 600 and is typically threadably attached to the outer end of threaded section 460 which projects past the end wall 468 of outlet distributor 466. The inner wall 470 of end insert 472 of gun 308, as shown in FIG. 13, is spaced from outer wall 474 of outlet distributor 466 to form a flow passage 476 to transfer air-entrained, charged powder coating material received from charging section 28 across the flow surface 603 of powder deflector 600.

As shown in FIGS. 24 and 24A, powder deflector 600 has a rear section 604 with a cylindrically shaped outer wall 605 symmetrically disposed about a center line 606 extending axially through the powder deflector. Powder deflector 600 also includes a forward section 608 having a conical outer wall 610 which intersects cylindrically shaped outer wall 605 at one end and a narrow, cylindrically shaped end wall 612 at the opposite end. A front surface 614 intersects end wall 612 at one end and a surface 616, which converges towards the rear section 604, at the opposite end. Surface 616 intersects a flat surface 617 which is disposed substantially perpendicular to centerline 606 within a front opening 619 of powder deflector 600. A central bore 618, which forms a portion of air passage 641, extends through powder deflector 600 to direct air into front opening 619 of powder deflector 600. Central bore 618 is typically threaded to threadably attach powder deflector 600 to the outer end of threaded section 460 of gun tube 456. A circular groove 620 is formed in flat surface 617 and arranged coaxially with central bore 618 about centerline 606 and opens into the open front portion 619 of powder deflector 600. Centerline 622, extending perpendicular to a plane through front surface 614, is offset at an angle b of between about 6° and 8°, and preferably at an angle b of about 4° from centerline 606 extending through powder deflector 600. When powder deflector 600 is mounted to the nozzle assembly 601, centerline 606 is coincident with centerline 482 of gun 308.

When powder deflector 600 is assembled into nozzle assembly 601, e.g., onto end section 460 of gun tube 456 to abut against end wall 468 of outlet distributor 466, the width of the annular powder flow passage 607 between the flow surface 603 (formed of outer wall 605 and outer wall 610) of powder deflector 600 and the inner wall 470 of insert 472 varies because of the offset of powder deflector 600, in the same manner as described before regarding nozzle deflector 430 being mounted in nozzle assembly 473. Therefore, a larger volume of powder material exits nozzle assembly 601 across the top of powder deflector 600 as compared to the powder material exiting the nozzle assembly across the bottom of deflector 600. Since the welded seam of the can will typically be located opposite the upper portion, or twelve o'clock position of the nozzle assembly 601, more powder will be sprayed onto the welded seam than of the remainder of the interior side wall of the can. This will ensure that the welded seam of the can is effectively coated with powder.

An important aspect of the modified powder deflector 600 is the inclusion of an air deflector 602 in the open front portion 619 of the powder deflector. Air deflector 602 is constructed with a front, disc-shaped portion 626 having a convex front surface 630. A rear hollow cylindrical section 632 extends outward from a rear surface 634 of disc-shaped portion 626. A plurality of radially arranged holes 636 are disposed through the wall forming the hollow rear cylindrical section 632. Air deflector 602 is securely mounted in the open front portion 619 of powder deflector 600 by inserting the rear hollow cylindrical section 632 into circular groove 620. A friction fit, between the outer surface of the wall forming hollow cylindrical section 632 and circular groove 620, secures air deflector 602 to powder deflector 600. The surface of bore 618 opening into front portion 619 forms, with the inner surface 640 of the hollow cylindrical section 632, interior air passage 641 which communicates through holes 636 to an outer air passage 642 between surface 616 of powder deflector 600 and rear surface 634 of air deflector 602. Air deflector 602 is mounted to powder deflector 600 to form an air gap 644 which extends 360° between rear surface 634 of the air deflector and front surface 614 of the powder deflector.

During operation of a powder gun incorporating nozzle assembly 601, air-entrained powder coating material being sprayed across powder deflector 600 forms a cloud of the powder coating material to be deposited on the interior surface of a can. The air of the air-entrained powder is the predominant force in directing the powder coating material from the powder gun towards the surface of the can. Electrostatic forces, especially of tribo-charged particles of powder coating material, are effective to draw the particles onto the interior surface of a can located a distance of up to a few centimeters from the annular flow passage 607 from where the powder material exits nozzle assembly 601. The addition of air deflector 602 to powder deflector 600 both modifies the shape of the cloud of air-entrained powder material and directs the powder cloud to the inner surface of the can. That is, the flow of pressurized air from the interior flow passage 618, through holes 636 to an outer air passage 642, and through air gap 644 shapes the cloud of powder coating material and increases the force with which the cloud of powder material is directed towards the interior wall of the can. A secondary effect of increasing the efficiency with which the powder coating material is directed onto the surface of the can is the reduction of powder build-up on the front surface 630 of air deflector 602. While the gap 644 is illustrated as having an equal width throughout the 360° of its opening, it is within the scope of the invention to provide a gap with a variable width. In that case, the design of the air gap provides a dispersion of the cloud of powder coating material that would tend to distribute the powder in any desired manner.

MODIFIED AIR DEFLECTOR

In an alternative embodiment of an air deflector mounted in a powder deflector 600, as shown in FIG. 25, a hole 650 extends through the center of the front disc-shaped section 626'. A porous element 652, such as webbed Delrin® cloth having a 15%–20% porosity, is mounted to the front surface 630' by means such as gluing the edges of the cloth to the edges of disc-shaped section 626'. The compressed air, typically in the range of 8 psi to 14 psi, in air passage 641, flows through hole 650 and builds up in the space created between front surface 630' and the porous cloth 652 due to the air pressure. The compressed air seeps through porous cloth 652 and blows off powder which might collect on the outer surface of porous cloth 652.

MODIFIED COLLECTION HOOD

Figure 27:
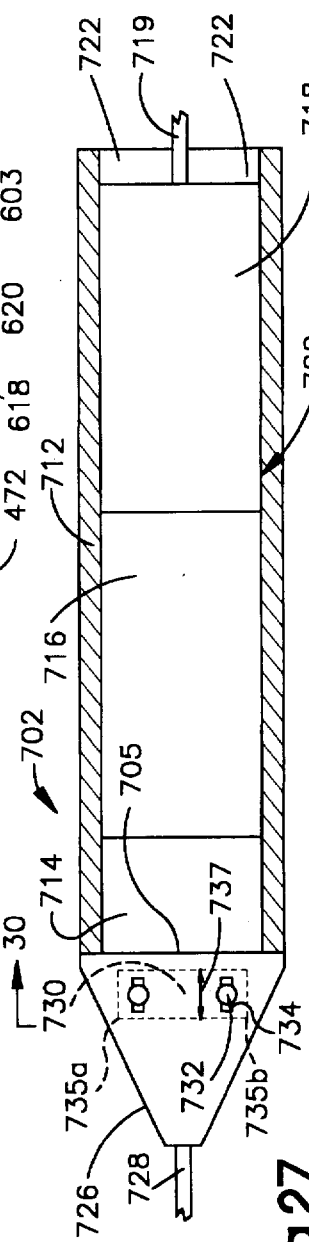
FIG. 27 is a view of the improved collection hood taken along line 27—27 of FIG. 26.
Figure 26:
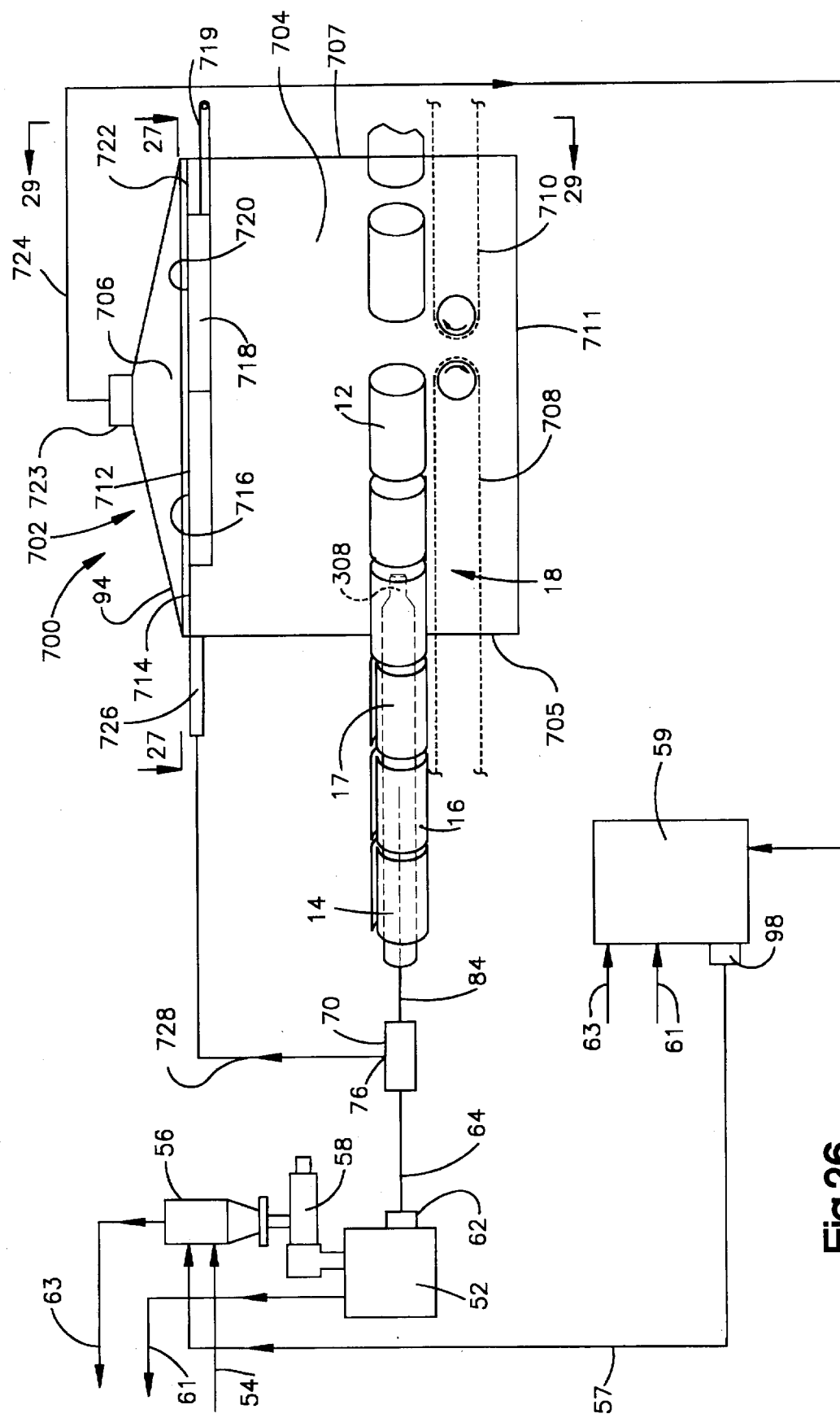
FIG. 26 is a schematic illustration of one embodiment of a can body production line which includes a system for applying a coating of powder to the interior surface of a welded hollow can body and an improved collection hood with a variable sized outlet opening in accordance with the present invention.
Figure 29:
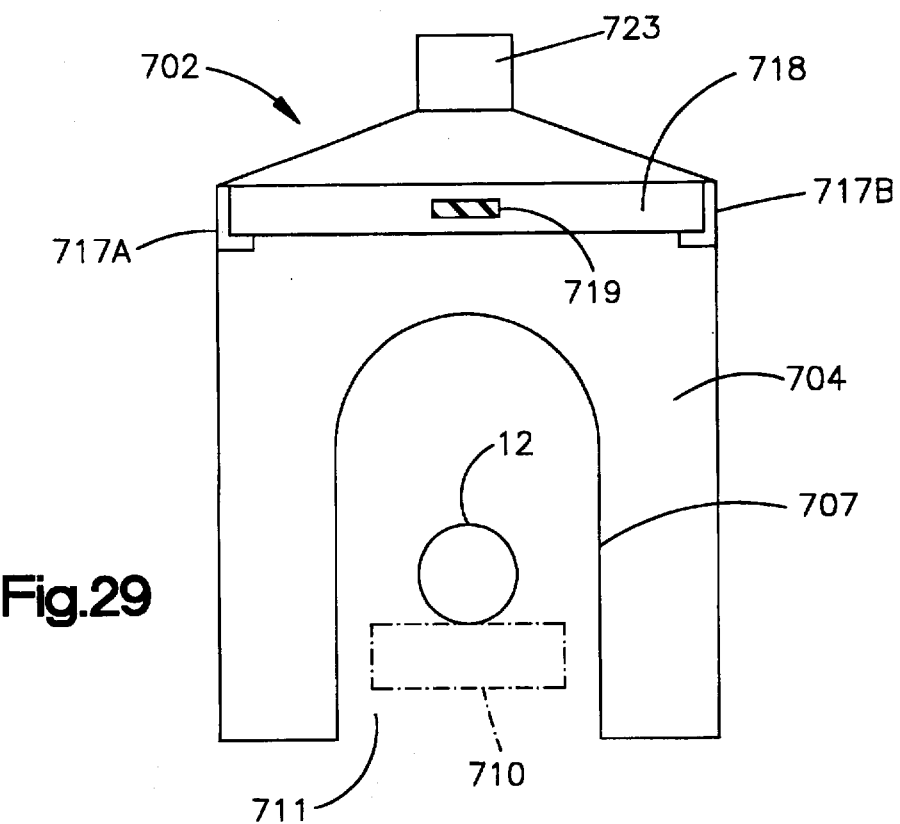
FIG. 29 is a view of the improved collection hood taken along line 29—29 of FIG. 26.

Referring to FIGS. 26, 27 and 29, there is illustrated diagrammatically a can forming machine 700 which is substantially identical to can forming machine 10 illustrated in FIG. 12 with the exception of the addition of a modified collection hood 702 as shown in FIGS. 26, 27 and 29. Collection hood 702 includes a powder coating chamber 704 and a vacuum chamber 706 disposed adjacent, and preferably directly above the powder coating chamber 704. Powder coating chamber 704 has an inlet opening 705 at one side and an outlet opening 707 through the opposite side. Two conveyors 708 and 710, typically belts which carry the cans 12 down the production line, are located within the coating chamber 704 and are disposed in end to end relation to transfer cans 12 from conveyor belt 708 to conveyor belt 710. Input conveyor belt 708 extends out of coating chamber 704 through inlet opening 705 and typically operates at a first speed of about 55 feet per minute (fpm). Output conveyor 710 extends out of coating chamber 704 through outlet opening 707 and typically operates at a second speed of about 110 fpm which is significantly faster than the speed of input conveyor 708. A powder coating gun 308, mounted to the downstream end of welding arm 14, extends into inlet opening 705 of coating chamber 704 so that can bodies 12 pass over the powder coating gun within collection hood 702.

Powder coating chamber 704 and vacuum chamber 706 are divided by an intermediate wall 712. Wall 712 is provided with a fixed sized opening 714 located adjacent inlet opening 705 and directly above the nozzle assembly of gun 308. In the portion of wall 712 located adjacent to and directly downstream from opening 714 is a closed section 716 to which is mounted a moveable plate 718 that is supported by conventional means such as channels 717A, 717B extending in the lengthwise direction of the collector hood (not shown). A variable sized opening 720 is disposed directly adjacent and downstream from closed section 716. Opening 720 is sized so that moveable plate 718 can completely close opening 720 when the plate is moved into the position as shown in FIGS. 26 and 27. Moveable plate 718 is operated by conventional means such as a hydraulic cylinder (not shown) connected by an actuator arm 719 to the plate. A fixed opening 722 is located next to opening 720. The purpose of fixed opening 722 is to collect any overspray which has not been collected through opening 714 or opening 720. The vacuum chamber 706 directly above wall 712 has an outlet opening 723 that is connected by an outlet line 724 to powder collector 59.

Figure 30:
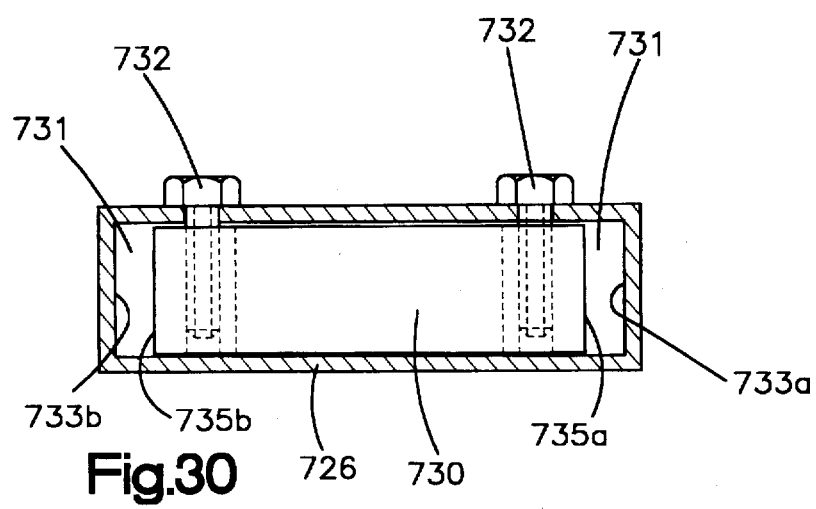
FIG. 30 is a view taken along line 30—30 of FIG. 27.

Another important aspect of the collector hood 702 is the provision of an inlet 726 mounted to powder coating chamber 704 at the side of inlet opening 705 just below fixed opening 714. As shown in FIG. 26, inlet 726 is connected by a line 728 to the vent passage 76 of densifier 70. Inlet 726 has a flat triangular shape and contains a plate 730 whose purpose is to allow powder from densifier 70 to be collected within collector hood 702 without affecting the operation of the densifier. Plate 730, which is slidably mounted within the inlet 726, adjusts the size of the flow passage 731, defined as the area between the corners 735a and 735b of plate 730 and the inner side walls 733a and 733b, respectively, through inlet 726 (see FIG. 30). Plate 730 moves within the inlet 726 towards and away from collector hood 702 (shown by an arrow 737 in FIG. 27) and is secured in place by bolts 732 extending through slots 734 in the upper wall of inlet 726. As plate 730 is located closer to inlet line 728, the size of flow passage 731 through inlet 726 is reduced and less vacuum is drawn on densifier 70 by the suction force in chamber 706, and therefore less air and powder is drawn into inlet 726 via line 728. The position of plate 730 within inlet 726 is normally adjusted so that the vacuum drawn on densifier 70 by line 728 does not substantially effect the amount of air and powder being vented from vent 76 of densifier 70 and into the collection hood 702 so that it can be recycled.

During a can spraying mode of operation, the can bodies 12 are formed over welding arm 14 and welded together at seaming station 17 of can forming machine 700, as discussed before. As the cans move off welding arm 14, they pass over an inside powder coating station 18 where a protective coating of coating powder material is sprayed onto the interior surface of the hollow container bodies 12, including seam areas 22 as shown in FIG. 2. The coating powder material is electrostatically applied to the interior surface of can bodies 12 by a powder coating gun 308, which has a charging section and a spray nozzle as described before. The cans are disposed on welding arm 14 with a very small gap, i.e., 2mm, between adjacent cans so that the powder material being sprayed is substantially contained within the cans. Still, as the cans pass over the spray gun, a small amount of powder leaks out from the small gap between adjacent cans.

To collect this oversprayed powder, without disturbing the powder within the cans, moveable plate 718 is moved to a first position under closed section 716 so that the area of opening 720 is open and substantially unrestricted. Then, the majority of the air flow through collector hood 702 is drawn from powder coating chamber 704, through the open section 720 into vacuum chamber 706 and through outlet opening 722 to exhaust line 724. Exhaust line 724 is connected to a source of negative pressure such as a fan within overspray collector 59. As shown in FIG. 26, open section 720 is disposed above the gap between the input and output conveyors 708 and 710, respectively, so that the air flow into vacuum chamber 706 is concentrated over the cans being transferred onto output conveyor belt 710. The cans on output conveyor 710 are spaced further apart than the cans on input conveyor 708 because the higher speed of the output conveyor causes the cans to spread apart when they are transferred from the slower moving input conveyor 708 to the faster moving output conveyor 710. Since collector hood 702 has an open bottom 711, a substantial air flow is created from below hood 702 up past the upstream end of conveyor 710 into opening 720. This air flow draws oversprayed powder which escapes from the cans as they are being separated up into opening 720. This enables the air flow to easily reclaim any nonadhered powder from the cans which are now further spaced apart.

Typically, during the can spraying mode of operation, plate 730 is positioned in inlet 726 closer to line 728 to decrease the size of flow passage 731 and reduce the air and powder being pulled through inlet 726 and line 728 from densifier 70 which could affect the performance of densifier 70.

During a test mode of operation, when the spray pattern is being checked, no cans are moving down the line but powder gun 308 is still spraying powder. It is important to reclaim all of the powder from powder gun 308 to prevent the conveyors or accessory parts, such as the conveyor belts, from being contaminated by the coating powder. In the test mode of operation, plate 718 is moved from its first location under section 712 to a second location to cover the opening 720. Then, the airflow from the powder coating chamber 704 to vacuum chamber 706 will be primarily through fixed opening 714 with a smaller amount through outlet opening 722. This configuration provides a high velocity air flow concentrated at the fixed opening 714 which is positioned directly above the nozzle of spray gun 308. Therefore, the powder being sprayed from gun 308 is directly reclaimed into the vacuum chamber 706 without contaminating the conveyors or accessory parts. With opening 720 closed, more suction force is applied to inlet 726 and more powder is pulled from densifer 70 via line 728. While more powder is drawn through line 728 from densifier 70 in the test mode, it is not important during the test mode of operation because the cans are not being sprayed. Note that the position of plate 730, during the test mode of operation, is unchanged from its position during the can spraying mode of operation because there is no concern about the powder being sprayed.

Figure 28:
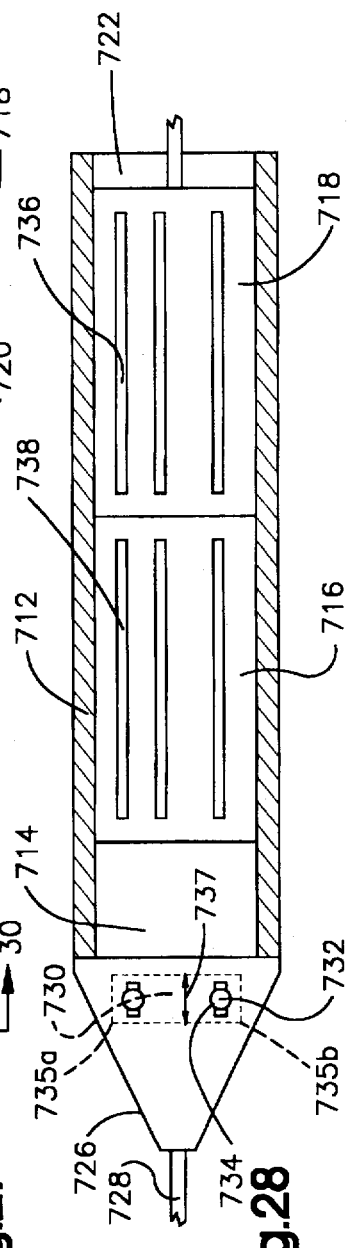
FIG. 28 is a view of an alternative embodiment of the portion of the improved collection hood shown in FIG. 27.

In an alternative embodiment of collection hood 702, as shown in FIG. 28, elongated slots 736 and 738 are provided in moveable plate 718 and closed section 716 of wall 712, respectively. These elongated slots 736 and 738 align with each other when plate 718 is moved into the first position under section 716 to increase the recovery of any powder that escapes through the gaps between the cans as the cans move along the input conveyor belt 708. Alternatively, plate 718 is in the second position to cover the opening 720 during the test mode of operation, as described above with reference to the embodiment illustrated in FIG. 27. Then, the airflow from the powder coating chamber 704 to vacuum chamber 706 will be primarily through fixed opening 714 with a smaller amount through elongated slots 736 and 738 of plate 718 and closed section 716. This configuration provides a high velocity air flow concentrated at the fixed opening 714 which is positioned directly above the nozzle of spray gun 308. Therefore, the powder being sprayed from gun 308 is, for the most part, directly reclaimed into the vacuum chamber 706 without contaminating the conveyors or accessory parts. While three slots are illustrated, it is within the terms of the invention to use any number of slots or other shaped openings.

It is apparent that there has been provided in accordance with this invention an apparatus and method that satisfies the objects, means and advantages set forth hereinbefore. Methods and apparatus are disclosed for spraying powder into the interior of welded hollow can bodies from a spray gun mounted to the welding arm of a can forming machine. The spray gun can either apply a stripe of charged powder coating material on the welded seam areas of hollow can bodies, or can simultaneously apply a coating of powder coating material having a first thickness on the longitudinally welded seam areas and a second thickness less than the first thickness on the remainder of the interior surface. Air is vented off from the flow of powder coating material being transported through the welding arm so that the powder to air ratio is increased. Air is introduced at the downstream end of the welding arm to provide a suction force to help draw the powder flow through the welding arm and to increase the velocity of the powder flow for better tribo charging of the powder in the gun and to improve spray pattern stability. A flow of cleaning air through the powder spray gun prevents powder from collecting on the front surface of an offset nozzle secured to the spray gun. The gun assembly is effectively grounded to prevent arcing, and has an exterior shape which has been geometrically configured to improve powder coating of the can. Sufficient electrostatic charging of the powder coating material is provided to ensure that the powder coating material adheres to the interior of hollow container bodies being coated. The gun assembly is provided with an offset nozzle assembly so that the welded seam area is coated with more powder coating material than the remainder of the interior surface of hollow container bodies. The offset nozzle assembly can incorporate an air deflector for both directing a flow of air into the powder coating material to control the shape of the spray pattern and for cleaning the front surface of the air deflector from powder coating material. A collector hood surrounds an input conveyor on which cans are transported while being coated and an output conveyor which removes the cans at a higher speed than at which they traveled on the input conveyor. The collector hood has two operating conditions for collecting oversprayed powder from between cans during the spraying operation or directly from the gun when cans are not being sent down the line.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A system for electrostatically coating at least a portion of the interior surface of hollow container bodies moving along a predetermined path with a coating powder, said system comprising:

a) a powder coating gun for spraying air-entrained coating powder within said hollow container bodies to form a coating of said coating powder on said at least a portion of the interior surface of said hollow container bodies, said powder coating gun being mounted to a downstream end of a welding arm of a can forming machine;

b) a delivery passage extending through said welding arm for transporting said air-entrained coating powder through said welding arm, said delivery passage connected at an upstream end to a densifer and at a downstream end to said powder coating gun for supplying said air-entrained coating powder to said powder coating gun; and c) the densifer being connected to said delivery passage for venting off air and coating powder from said air-entrained coating powder prior to delivering said coating powder to increase the flow rate of coating powder flowing through said delivery passage to said powder coating gun.

2. The system of claim 1 further including a tribo-electric powder charging device located intermediate said powder coating gun and said delivery passage.

3. The system of claim 1 further including a collection hood disposed adjacent said powder coating gun for collecting oversprayed powder which escapes from said hollow container bodies moving along said predetermined path and returning the collected overspray powder to said delivery passage.

4. The system of claim 1 wherein said powder coating gun includes means for spraying the entire interior surface of said hollow container bodies.

5. The system of claim 1 wherein said powder coating gun includes means for spraying longitudinally extending welded seam areas within said hollow container bodies.

6. The system of claim 1 wherein said powder coating gun includes a spray nozzle for spraying a longitudinally extending welded seam area within said hollow container bodies with a coating of said coating powder having a first thickness and the remainder of said interior surface of said hollow container bodies with a coating of said coating powder having a second thickness less than said first thickness.

7. The system of claim 6 wherein said spray nozzle has an inner cone located within a conical interior of an outer shroud to produce an annular spray opening for applying powder onto interior walls of said container bodies.

8. The system of claim 7 wherein said spray nozzle further includes an enlarged portion of said annular spray opening for spraying said first thickness.

9. The system of claim 6 wherein said spray nozzle is an offset spray nozzle having a rear cylindrical section located within an outlet opening of said powder gun to produce a continuous annular spray opening for applying powder onto said interior surface of said container bodies.

10. The system of claim 9 wherein said offset spray nozzle has a forward section with a frustroconically-shaped outer wall, said forward section having a first center line along a first axis therethrough, said first axis is offset from a second axis extending longitudinally through said spray gun to form said single continuous annular spray opening with an enlarged portion for spraying said first thickness.

11. The system of claim 10 wherein said offset spray nozzle includes a porous disk mounted to the front end of said forward section.

12. The system of claim 1 wherein said densifer includes a densifer body with a flow passage, an inlet section, a vented section and an outlet section, said inlet section being connected to a source of air-entrained powder, said outlet section being connected to said delivery passage, and said vented section including a vent passage extending through a wall of said densifer body.

13. The system of claim 1 further including a separator connected to said densifer for separating powder from said air and coating powder vented off from said air-entrained coating powder and for returning the separated powder to said delivery passage.

14. The system of claim 1 further including an amplifier disposed between said delivery passage and said powder coating gun for introducing compressed air into said flow of air-entrained powder flowing between said delivery passage and said powder coating gun.

15. The system of claim 14 wherein said device is an amplifier includes one or more air flow passages, said air flow passages being angled in the direction of flow of said air-entrained power.

16. The system of claim 14 further including a diffuser between said amplifier and said coating gun, said diffuser introducing compressed air into said air-entrained powder exiting said amplifier.

17. The system of claim 16 further including a first electrically conductive ground member mounted between said amplifier and said diffuser and a second electrically conductive ground member mounted between said diffuser and said coating gun, said first and second ground members being electrically grounded back through said welding arm.

18. The system of claim 17 wherein said first and second ground member are rings.

19. The system of claim 17 further including a third ground member mounted to said coating gun and grounded to said second ground member.

* * * * *